United States Patent [19]
Chung et al.

[11] Patent Number: 5,698,655
[45] Date of Patent: Dec. 16, 1997

[54] AEROSOL SUPPRESSANT COMPOSITIONS FOR SILICONE COATINGS

[75] Inventors: Kyuha Chung; Gary Rex Homan; Raymond Lee Tabler, all of Midland, Mich.

[73] Assignee: Dow Corning Corporation, Midland, Mich.

[21] Appl. No.: 736,878

[22] Filed: Oct. 25, 1996

Related U.S. Application Data

[62] Division of Ser. No. 353,017, Dec. 9, 1994, Pat. No. 5,625,023.

[51] Int. Cl.$^6$ ............................................. C08G 77/08
[52] U.S. Cl. ......................... 528/29; 528/14; 528/15; 528/31; 252/305
[58] Field of Search ...................... 528/29, 14, 15, 528/31; 252/305

[56] References Cited

U.S. PATENT DOCUMENTS

| | | | |
|---|---|---|---|
| 2,823,218 | 2/1958 | Speier et al. | 260/448.2 |
| 3,445,420 | 5/1969 | Kookootsedes et al. | 260/37 |
| 3,478,075 | 11/1969 | Troon et al. | 260/448.2 |
| 3,629,310 | 12/1971 | Bailey et al. | 260/448.8 R |
| 3,792,073 | 2/1974 | Prokai et al. | 260/448.8 R |
| 4,025,456 | 5/1977 | Litteral et al. | 252/351 |
| 4,256,870 | 3/1981 | Eckberg | 528/15 |
| 4,465,818 | 8/1984 | Shirahata et al. | 528/12 |
| 4,472,563 | 9/1984 | Chandra et al. | 528/15 |
| 4,476,166 | 10/1984 | Eckberg | 427/387 |
| 4,520,160 | 5/1985 | Brown | 524/765 |
| 4,559,396 | 12/1985 | Sasaki et al. | 528/15 |
| 4,562,096 | 12/1985 | Lo et al. | 427/208.8 |
| 4,567,221 | 1/1986 | Maruyama et al. | 524/436 |
| 4,608,270 | 8/1986 | Varaprath | 427/35 |
| 4,609,574 | 9/1986 | Keryk et al. | 427/407.1 |
| 4,617,238 | 10/1986 | Crivello et al. | 428/452 |
| 4,736,048 | 4/1988 | Brown et al. | 556/454 |
| 4,752,633 | 6/1988 | Aasen et al. | 524/266 |
| 4,774,111 | 9/1988 | Lo | 427/387 |
| 4,831,064 | 5/1989 | Varaprath et al. | 522/99 |
| 4,847,398 | 7/1989 | Mehta et al. | 556/445 |
| 4,857,583 | 8/1989 | Austin et al. | 524/761 |
| 4,911,986 | 3/1990 | Keryk et al. | 428/447 |
| 4,954,554 | 9/1990 | Bunge | 528/388 |
| 4,961,963 | 10/1990 | Peters | 427/208.8 |
| 4,968,766 | 11/1990 | Kendziorski | 528/32 |
| 4,980,440 | 12/1990 | Kendziorski et al. | 528/15 |
| 5,017,717 | 5/1991 | Wright et al. | 556/413 |
| 5,032,662 | 7/1991 | Berger et al. | 528/25 |
| 5,036,117 | 7/1991 | Chung et al. | 522/172 |
| 5,057,549 | 10/1991 | Herzig et al. | 522/99 |
| 5,082,958 | 1/1992 | Herzig et al. | 556/413 |
| 5,087,716 | 2/1992 | Wright et al. | 556/413 |
| 5,095,067 | 3/1992 | Hara et al. | 524/506 |
| 5,104,927 | 4/1992 | Hara et al. | 524/731 |
| 5,145,915 | 9/1992 | Weitemeyer et al. | 525/403 |
| 5,270,423 | 12/1993 | Brown et al. | 528/15 |
| 5,281,656 | 1/1994 | Thayer et al. | 524/601 |
| 5,331,020 | 7/1994 | Brown et al. | 522/99 |

FOREIGN PATENT DOCUMENTS

| | | | |
|---|---|---|---|
| 2035369 | 1/1991 | Canada | C09D 183/07 |
| 0462389 | 5/1991 | European Pat. Off. | C08G 77/18 |
| 0562922 | 3/1993 | European Pat. Off. | C09D 183/06 |
| 52-23748 | 3/1977 | Japan . | |
| 7827495 | 9/1979 | Japan . | |
| 7827496 | 9/1979 | Japan . | |
| 7827497 | 9/1979 | Japan . | |
| 981811 | 8/1960 | United Kingdom . | |
| 9322369 | 11/1993 | WIPO | C08G 77/38 |

*Primary Examiner*—Margaret W. Glass
*Attorney, Agent, or Firm*—Timothy J. Troy

[57] ABSTRACT

The present invention relates to a method of preparing an aerosol suppressant composition and to use of the composition to reduce or suppress silicone mist in high speed coating processes and significantly increase the adhesion of the coating to the substrate. More particularly, the present invention relates to a method of preparing an aerosol suppressant composition by reacting an organosilicon compound, an oxyalkylene containing compound, and a catalyst. The composition, when added to curable silicone coatings, reduces the amount of silicone mist in high speed coating processes.

20 Claims, No Drawings

1

AEROSOL SUPPRESSANT COMPOSITIONS FOR SILICONE COATINGS

This application is a division of application Ser. No. 08/353,017 filed Dec. 9,1994 which application is now U.S. Pat. No. 5,625,023: pending.

BACKGROUND OF THE INVENTION

The present invention relates to a method of preparing an aerosol suppressant composition and to the use of the composition to reduce or suppress silicone mist in high speed coating processes and significantly increase the adhesion of the coating to the substrate. More particularly, the present invention relates to a method of preparing an aerosol suppressant composition by reacting an organosilicon compound, an oxyalkylene containing compound, and a catalyst. The composition, when added to curable silicone coatings, reduces the amount of silicone mist in high speed coating processes.

One of the current trends in the silicone coating industry is trying to operate coating machinery as fast as possible to increase productivity. As silicone materials are applied to a substrate at very high speed such as 1000 to 1500 ft/min the coating material tends to form a "mist" which comprises very fine particles blown out from the coating head. Recently this phenomenon has become one of the most serious problems in the industry. Although the coating materials are capable of fast thermal cure or are even radiation curable, presently they cannot be coated at high speed due to the misting problem.

Another trend in the silicone coatings industry is to use plastic films such as polyolefins and polyesters as a substrate for the curable coating which requires that the silicone coating anchors to the plastic film. To obtain good anchorage on the films has in the past required curing at higher temperatures at slow curing rates. Thus fast cure formulations could not be applied to plastic films due to the aforementioned problems. Furthermore, since plastic films cannot tolerate high temperatures during the coating process only very limited applications exist which can employ plastic films as substrates for coatings. The present invention is directed at solving these problems.

Organosilicon compounds containing oxyalkylene functionality have been described in the art. For example, in Great Britain Patent Specification No. 0981811 there is disclosed a siloxane-oxyalkylene block copolymer useful in the preparation of cellular materials which are prepared by reacting a polyalkylene glycol containing as one terminal group carbamidoalkyl radicals or sulphonamidoalkyl radicals with a hydrocarbonoxy polysiloxane preferably in the presence of an alkali hydroxide or alkali metal salt catalyst. Jack et al. in U.S. Pat. No. 3,478,075 disclose terpolymers which contain at least one polysiloxane block, at least one polyoxyalkylene block, and at least one block selected from polyvinylester and partially and wholly hydrolysed polyvinylesters useful as surfactants or cell control agents in polyurethane foam systems which are prepared by a variety of methods.

Litteral et al. in U.S. Pat. No. 4,025,456 disclose a process for preparing siloxane-oxyalkylene copolymers which includes a hydrosilylation reaction between an organohydrogenpolysiloxane reactant and an olefinically substituted polyoxyalkylene reactant which may be conducted without a solvent or conducted in an oxygen containing solvent such as an ether, a polyether, or a lower or higher molecular weight alcohol.

Mehta et al. in U.S. Pat. No. 4,847,398 disclose a process for the preparation of siloxane-oxyalkylene copolymers in an essentially solventless system which comprises forming a mixture of an organohydrogensiloxane, a polyoxyalkylene compound, and a carboxylic acid or a carboxylic acid salt as a reaction promoter, adjusting and maintaining the temperature of said mixture to a temperature to promote the reaction of said organohydrogensiloxane with said polyoxyalkylene, adding to said mixture a catalytic amount of a noble metal hydrosilylation catalyst, allowing said reaction to go to completion, and recovering said copolymer.

Another process for preparing siloxane-oxyalkylene copolymers is described in Austin et al., U.S. Pat. No. 4,857,583 which discloses a process for preparing organosiloxane copolymer surfactants in a saturated, polar, high boiling point polyol solvent which comprises forming a mixture of an organohydrogensiloxane, a polyoxyalkylene compound, a liquid, saturated, polar, polyol, solvent having a boiling point of greater than 175° C., and optionally a salt of a carboxylic acid as a reaction promoter, maintaining said mixture in an inert atmosphere and adding to said mixture a catalytic amount of a noble metal hydrosilylation catalyst, reacting the mixture at a temperature below about 92° C., and recovering the surfactant in admixture with residual polyol solvent.

Silicone compounds suitable for use as defogging compositions or as anti-misting agents have also been described. For example, Maruyama et al. in U.S. Pat. No. 4,567,221 disclose water resistant compositions which contain a modified polyvinyl alcohol having a silyl group in the molecule and an organic substance, useful as compositions for treating inorganic materials and defogging compositions. Japanese Patent Application Laid-open Nos. 27495/1978, 27496/1978, and 27497/1978 disclose thermosetting resin compositions giving anti-misting coatings, one prepared by hydrolysing a mixture of aminosilane and vinylsilane, or by further adding a copolymer of hydrophilic vinyl monomers, or a transparent thermosetting resin composition prepared from a mixture of an aminoalkoxysilane, a mercaptopropyl trimethoxysilane, and a vinyl copolymer.

Japanese Patent Application Laid-open No. 23748/1977 discloses anti-misting agents prepared by adding ethylene glycol and/or glycerol to polyethylene glycol, heating, and then addition of a silicone type water repellant and molding.

However, none of these references discloses a method of preparing an aerosol suppressant composition comprising reacting an organosilicon compound, an oxyalkylene containing compound, and a catalyst which, when added to curable silicone coatings, reduces the amount of mist in high speed coating processes.

SUMMARY OF THE INVENTION

Thus the present invention relates to a method of making an aerosol suppressant composition which comprises reacting a mixture of an organosilicon compound, an oxyalkylene compound, and a catalyst. The present invention further relates to the use of this composition in silicone coatings such that addition of the composition to a coating results in the suppression of silicone mist produced during high speed coating processes. The present invention also relates to the use of the aerosol suppressant compositions in processes for preparing a laminate of a substrate and an adhesive wherein the adhesive will release from the substrate.

It is an object of this invention to provide an aerosol suppressant composition capable of mist suppression in silicone coatings employed in high speed coating processes.

It is also an object of this invention to provide an aerosol suppressant composition which significantly increases the adhesion of the coating to various substrates.

It is an additional object of this invention to provide an aerosol suppressant composition which improves the anchorage of the coating on films.

These and other features, objects and advantages of the present invention will be apparent upon consideration of the following detailed description of the invention.

DETAILED DESCRIPTION OF THE INVENTION

The present invention relates to a method of making an aerosol suppressant composition, the method comprising the steps of: (I) reacting a mixture of: (A) an organosilicon compound selected from the group consisting of (i) an organohydrogensilicon compound, (ii) an organosilicon compound having in the compound at least one group selected from the group consisting of olefinic hydrocarbon radicals having from 2 to 14 carbon atoms, vinyl ether groups, epoxy groups, amine groups, hydroxyl groups, alkoxy groups, carboxyl groups, isocyanate groups, oxime groups, acetoxy groups, and mixtures thereof, and (iii) mixtures of (i) and (ii); (B) a compound having its formula selected from the group consisting of: $RO—(R^1O)_x—(R^2)_y—R$, $RO—(R^1O)_x—R$, and $RO—(R^2O)_y—R$, wherein R is selected from the group consisting of hydrogen and an olefinic hydrocarbon radical having from 3 to 14 carbon atoms, $R^1$ and $R^2$ are alkylene radicals having from 2 to 4 carbon atoms with the proviso that $R^1$ and $R^2$ are not the same alkylene radical at any given time, x has a value of from 1 to 200, y has a value of from 1 to 200, with the proviso that R is the same on both molecular chain ends; and (C) a catalyst selected from metal catalysts or complexes of metal catalysts to form a reaction product.

The method of the present invention comprises reacting organosilicon compound (A), compound (B) and compound (C). The organosilicon compound (A) can be (i) an organohydrogensilicon compound. The organohydrogensilicon compound is preferably free of aliphatic unsaturation and contains two or more silicon atoms linked by divalent radicals, an average of from one to two silicon-bonded monovalent radicals per silicon atom and an average of at least one, and preferably two, three or more silicon-bonded hydrogen atoms per compound. Preferably the organohydrogensiloxane contains an average of three or more silicon-bonded hydrogen atoms such as, for example, 5, 10, 20, 40, 70, 100, and more. The organohydrogensiloxane compounds suitable as compound (A) can be linear, branched, cyclic, resins, and combinations thereof.

Highly preferred linear organohydrogenpolysiloxanes as (A) have the formula $YMe_2SiO(Me_2SiO)_p(MeYSiO)_qSiMe_2Y$ wherein Me denotes methyl, and Y denotes hydrogen or methyl. An average of at least two Y radicals per compound must be hydrogen atoms. The subscripts p and q can have average values of zero or more and the sum of p plus q has a value ranging from 0 to 1000. The disclosure of U.S. Pat. No. 4,154,714 is incorporated herein by reference to teach highly-preferred organohydrogenpolysiloxanes.

Especially preferred as compound (A) are methylhydrogensiloxanes selected from the group consisting of bis (trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogendimethylsiloxane copolymers such as dimethylhydrogensiloxy terminated methylhydrogendimethylsiloxane copolymers.

The organosilicon compound (A) can also be (ii) an organosilicon compound having at least one group selected from the group consisting of olefinic hydrocarbon radicals having from 2 to 14 carbon atoms, vinyl ether groups, epoxy groups, amine groups, hydroxyl groups, alkoxy groups, carboxyl groups, isocyanate groups, and mixtures thereof.

The olefinic hydrocarbon radicals of (ii) may have from 2 to 14 carbon atoms. The olefinic hydrocarbon radicals are preferably selected from the group consisting of the vinyl radical and higher alkenyl radicals represented by the formula $—R^3(CH_2)_rCH=CH_2$ wherein $R^3$ denotes $—(CH_2)_s—$ or $—(CH_2)_tCH=CH—$ and r has the value of 1, 2, or 3, s has the value of 0 to 9, and t has the value of 3, 4, or 5. The higher alkenyl radicals represented by the formula $—R^3(CH_2)_rCH=CH_2$ contain at least 6 carbon atoms. For example, when $R^3$ denotes $—(CH_2)_s—$, the higher alkenyl radicals include 5-hexenyl, 6- heptenyl, 7-octenyl, 8-nonenyl, 9-decenyl, and 10-undecenyl. When $R^3$ denotes $—(CH_2)_tCH=CH—$, the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl, are preferred. It is more preferred that $R^3$ denote $—(CH_2)_s—$ so that the radicals contain only terminal unsaturation and the most preferred radicals are the vinyl radical and the 5-hexenyl radical.

Specific examples of preferred olefinic hydrocarbon containing polydiorganosiloxanes for use as organosilicon compound (ii) include $ViMe_2SiO(Me_2SiO)_aSiMe_2Vi$, $HexMe_2SiO(Me_2SiO)_aSiMe_2Hex$, $Vi_2MeSiO(Me_2SiO)_aSiMeVi_2$, $Hex_2MeSiO(Me_2SiO)_aSiMeHex_2$, $Vi_3SiO(Me_2SiO)_aSiVi_3$, $Hex_3SiO(Me_2SiO)_aSiHex_3$, $PhMeViSiO(Me_2SiO)_aSiPhMeVi$, $HexMe_2SiO(Me_2SiO)_a(MeHexSiO)_bSiMe_2Hex$, $ViMe_2SiO(Me_2SiO)_a(MeViSiO)_bSiMe_2Vi$, $Hex_2MeSiO(Me_2SiO)_a(MeHexSiO)_bSiMeHex_2$, $Vi_2MeSiO(Me_2SiO)_a(MeViSiO)_bSiMeVi_2$, $Hex_3SiO(Me_2SiO)_a(MeHexSiO)_bSiHex_3$, $Vi_3SiO(Me_2SiO)_a(MeViSiO)_bSiVi_3$, wherein Me, Vi, Hex, and Ph denote methyl, vinyl, 5-hexenyl, and phenyl, respectively and a has a value of 0 to 500 and b has value of 0 to 200.

The organosilicon compound (A) can also be (ii) an organosilicon compound having at least one vinyl ether group in the compound. The vinyl ether groups can be bonded to silicon via SiC or SiOC bonds. Organosilicon compounds having vinyl ether groups attached to silicon via SiC bonds are exemplified compounds such as those disclosed in U.S. Pat. No. 4,617,238 to Crivello, U.S. Pat. No. 5,057,549 to Herzig et al., European Patent Publication No. 0462389, Canadian Patent Application No. 2,035,369, U.S. Pat. No. 5,145,915, and PCT Patent Application No. 9322369 incorporated herein by reference to teach SiC bonded vinyl ether functional organopolysiloxanes suitable as organosilicon compound (ii). Particularly preferred as the SiC bonded vinyl ether containing organosilicon compound are vinyl ether functional organopolysiloxanes having the formula

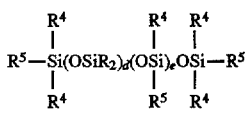

wherein $R^4$ is a monovalent hydrocarbon or halohydrocarbon radical having from 1 to 20 carbon atoms or an alkoxy radical having from 1 to 8 carbon atoms, $R^5$ is $R^4$ or is a group having its formula selected from the group consisting of (a) $(CH_2)_n(OR^6)_cOCH=CH_2$ and (b) $(H_2C=CHOR^6)_zCR^7_{4-z}(OR^6)_c(CH_2)_n$— wherein $R^6$ is a divalent hydrocarbon or halohydrocarbon radical having from 1 to 20 carbon atoms, $R^7$ is a monovalent hydrocarbon or halohydrocarbon radical having from 1 to 20 carbon atoms or hydrogen, and z has a value of 1 or 2, d has a value from 0 to 500, and e has a value from 0 to 200, c has a value of 0 to 10, and n has a value of from 1 to 20, with the proviso that at least one group having its formula selected from the group consisting of (a) —$(CH_2)_n(OR^6)_cOCH=CH_2$ and (b) $(H_2C=CHOR^6)_zCR^7_{4-z}(OR^6)_c(CH_2)_n$— is present in the compound.

The monovalent radicals of $R^4$ can contain up to 20 carbon atoms and include halohydrocarbon radicals free of aliphatic unsaturation and hydrocarbon radicals. Monovalent hydrocarbon radicals include alkyl radicals, such as methyl, ethyl, propyl, butyl, hexyl, octyl, and decyl; cycloaliphatic radicals, such as cyclohexyl; aryl radicals, such as phenyl, tolyl, and xylyl; aralkyl radicals, such as benzyl and phenylethyl. Highly preferred monovalent hydrocarbon radical for R is methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. The several R radicals can be identical or different, as desired and preferably at least 50 percent of all R radicals are methyl.

The group $R^6$ hereinabove is a divalent hydrocarbon group having from 1 to 20 carbon atoms which is exemplified by groups such as alkylene radicals including methylene, ethylene, propylene, butylene, phenylene, trimethylene, 2-methyltrimethylene, pentamethylene, hexamethylene, 3-ethylhexamethylene, octamethylene, —$CH_2(CH_3)CH$—, —$CH_2CH(CH_3)CH_2$—, and —$(CH_2)_{18}$—, cycloalkylene radicals such as cyclohexylene, arylene radicals such as phenylene, combinations of divalent hydrocarbon radicals such as benzylene (—$C_6H_4CH_2$—), hydroxylated hydrocarbon residues, chloroethylene, fluoroethylene, —$CH_2CH_2CH_2OCH_2$—, —$CH_2CH_2OCH_2CH_2$—, —$CH_2CH_2OCH(CH_3)CH_2$—, and —$CH_2OCH_2CH_2OCH_2CH_2$—.

Organosilicon compounds having vinyl ether groups attached to silicon via SiOC bonds are exemplified compounds such as those disclosed in U.S. Pat. No. 5,270,423 to Brown et al. incorporated herein by reference to teach SiOC bonded vinyl ether functional organopolysiloxanes suitable as organosilicon compound (ii). Particularly preferred as the SiOC bonded vinyl ether containing organosilicon compound are vinyl ether functional organopolysiloxanes having the general formula

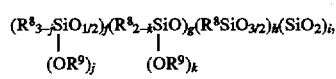

wherein $R^8$ is a monovalent hydrocarbon radical or halohydrocarbon radical having from 1 to 20 carbon atoms as delineated above, $R^9$ is selected from the group consisting of monovalent hydrocarbon or halohydrocarbon radicals having from 1 to 8 carbon atoms and a group having its formula selected from the group consisting of (i) —$R^{10}OCH=CH_2$ and (ii) —$R^{10}Si[OR^{10}OCH=CH_2]_{3-m}R^8_m$ wherein $R^{10}$ is a divalent hydrocarbon or halohydrocarbon radical having from 1 to 20 carbon atoms as delineated above, m has a value of 0 to 2, $R^8$ is as defined above, f has a mole percent of from greater than 0 to 100, g has a mole percent of from 0 to less than 100, h has a mole percent of from 0 to less than 100, i' has a mole percent of from 0 to less than 100, j is an integer of from 0 to 3, k is an integer of from 0 to 2, the sum of f+g+h+i' being equal to 100 mole percent, with the proviso that at least one ≡$SiOR^{10}OCH=CH_2$ group or ≡$SiOR^{10}Si[OR^{10}OCH=CH_2]_{3-m}R^8_m$ group exists in each compound such as the compounds disclosed in copending application for patent, Ser. No. 08/063,206, filed May 18, 1993, and copending application for patent, Ser. No. 08/291,660, filed Aug. 17, 1994, both applications assigned to the same assignee as the present application.

The organosilicon compound (A) can also be (ii) an organosilicon compound having at least one epoxy group in the compound. Preferred as (ii) are epoxy functional organopolysiloxanes have the general formula $AR^{11}_2SiO(R^{11}_2SiO)_u(R^{11}ESiO)_vSiR^{11}_2A$ wherein $R^{11}$ is a monovalent hydrocarbon radical having from 1 to 20 carbon atoms as delineated above, E is an epoxy group having its formula selected from

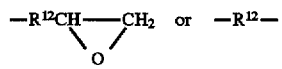

wherein $R^{12}$ is a divalent hydrocarbon group having from 1 to 20 carbon atoms as delineated above, A denotes R or E, u has a value of 0 to 500, v has a value of 0 to 200 with the proviso that there are at least two epoxy groups per compound. Preparation of such compounds is well known in the organosilicon art and needs no extensive delineation herein.

The organosilicon compound (A) can also be (ii) an organosilicon compound having at least one amine group in the compound. Preferred as (ii) are amino functional organopolysiloxanes have the general formula:

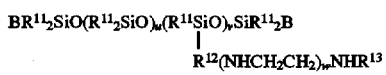

wherein $R^{11}$ and $^{12}$ are as defined above, $R^{13}$ denotes hydrogen or $R^{11}$, w has a value of 0 to 10, B denotes $R^{11}$ or —$R^{12}(NHCH_2CH_2)_wNHR^{13}$, u and v are as defined above, with the proviso that there are at least two —$R^{12}(NHCH_2CH_2)_wNHR^{13}$ groups per compound. Preparation of such compounds is well known in the organosilicon art and needs no extensive delineation herein.

The organosilicon compound (A) can also be (ii) an organosilicon compound having at least one hydroxyl group or alkoxy group in the compound. Preferred hydroxy and alkoxy functional organopolysiloxanes have the general formula

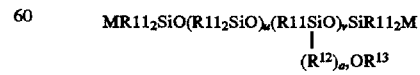

wherein $R^{11}$, $^{12}$, and $R^{13}$ are as defined above, a' has a value of 0 or 1, M denotes $R^{11}$ or —$(R^{12})_{a'}OR^{13}$, u and v are as defined above, with the proviso that there are at least two —$OR^{13}$ groups per compound. Preparation of such compounds is well known in the organosilicon art and needs no extensive delineation herein.

The organosilicon compound (A) can also be (ii) an organosilicon compound having at least one carboxyl group in the compound. Preferred carboxyl functional organopolysiloxanes have the general formula

wherein $R^{11}$, $^{12}$, and $R^{13}$ are as defined above, D denotes $R^{11}$ or $-R^{12}COOR^{13}$, u and v are as described hereinabove, with the proviso that there are at least two $-R^{12}COOR^{13}$ groups per compound. Preparation of such compounds is well known in the organosilicon art and needs no extensive delineation herein.

The organosilicon compound (A) can also be (ii) an organosilicon compound having at least one isocyanate group in the compound. Preferred as (ii) are isocyanate functional organopolysiloxanes have the general formula:

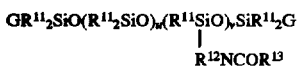

wherein $R^{11}$, $^{12}$, and $R^{13}$ are as defined above, G denotes $R^{11}$ or $-R^{12}NCOR^{13}$, u and v are as defined above, with the proviso that there are at least two $-R^{12}NCOR^{13}$ groups per compound. Preparation of such compounds is well known in the organosilicon art and needs no extensive deletation herein.

The organosilicon compound (A) can also be (ii) an organosilicon compound having at least one oxime group in the compound. Preferred as (ii) are oxime functional organopolysiloxanes have the general formula:

wherein $R^{11}$, $^{12}$, and $R^{13}$ are as defined above, J denotes $R^{11}$ or $-R^{12}CR^{13}=NOR^{13}$, u and v are as defined above, with the proviso that there are at least two $-R^{12}CR^{13}=NOR^{13}$ groups per compound. Preparation of such compounds is well known in the organosilicon art and needs no extensive delineation herein.

The organosilicon compound (A) can also be (ii) an organosilicon compound having at least one acetoxy group in the compound. Preferred as (ii) are acetoxy functional organopolysiloxanes have the general formula:

wherein $R^{11}$, $^{12}$, and $R^{13}$ are as defined above, L denotes $R^{11}$ or $-R^{12}CH_3COOR^{13}$, u and v are as defined above, with the proviso that there are at least two $-R^{12}CH_3COOR^{13}$ groups per compound. Preparation of such compounds is well known in the organosilicon art and needs no extensive delineation herein.

The organosilicon compound suitable as (ii) can also be an organosilicon compound having a mixture of any of the groups denoted above for (ii), such as an organosilicon compound having amino groups and isocyanate groups, an organosilicon compound having amino, carboxyl, and alkoxy groups, an organosilicon compound having olefinic hydrocarbon groups and alkoxy or hydroxy groups, etc.

The organosilicon compound (A) can also be a mixture of organosilicon compound (i) and (ii) delineated above, i.e. a mixture of the organohydrogensilicon compound (i) and the organosilicon compound having at least one group selected from the group consisting of olefinic hydrocarbon radicals having from 2 to 14 carbon atoms, vinyl ether groups, epoxy groups, amine groups, hydroxyl groups, alkoxy groups, carboxyl groups, isocyanate groups, oxime groups, acetoxy groups, or mixtures thereof (ii).

The olefinic hydrocarbon radicals suitable as R in compound (B) are as delineated for compound (A) including preferred embodiments thereof. Highly preferred olefinic hydrocarbon radicals for (B) include the vinyl radical and the 5-hexenyl radical. The group R is the same on both molecular chain ends of Compound (B), i.e. the R group must be identical on both ends of the chain. Thus if R is hydrogen on one end of compound (B), then R must be hydrogen on the other end of Compound (B), etc.

The groups $R^1$ and $R^2$ in compound (B) above are alkylene radicals having from 2 to 4 carbon atoms. Thus $R^1$ and $R^2$ can be selected from the group consisting of ethylene, propylene, butylene, isopropylene, and isobutylene. The groups $R^1$ and $R^2$ in compound (B) are preferably selected from ethylene, isopropylene, or a mixture thereof. The groups $R^1$ and $R^2$ are not the same alkylene radical at any given time. In the compound denoted as (B) hereinabove, x has a value of from 1 to 200, y has a value of from 1 to 200. It is preferred that x have a value from 10 to 100, and y have a value from 1 to 100. It is preferred that when compound (B) is an ethylene-isopropylene copolymer, that the value of x+y is from 10 to 40, when $R^1$ is ethylene only, the value of x is from 10 to 20, and when $R^1$ is isopropylene only, the value of x is from 25 to 40.

Groups suitable as compound (B) include compounds having their formula selected from the group consisting of $H_2C=CH-(CH_2)_{b'}-O-(C_2H_4O)_x-(C_3H_6O)_y-(CH_2)_{b'}-CH=CH_2$, $CH_3-CH=CH-(CH_2)_{b'}-O-(C_2H_4O)_x-(C_3H_6O)_y-(CH_2)_{b'}-CH=CH-CH_3$, and $HO-(C_2H_4O)_x-(C_3H_6O)_yH$ wherein b' has a value of 1 or greater than 1, the value of b' being the same or different as desired, x has a value of 0 to 200, and y has a value of 0 to 200 with the proviso that the value of x+y is at least 1.

The amount of compound (B) varies depending on the amount of compound (A) and catalyst (C) (delineated hereinbelow) that is employed. It is preferred that from 5 to 2000 weight parts of compound (B) be used per 100 weight parts of (A), and it is highly preferred that from 5 to 20 weight parts of compound (B) be employed per 100 weight parts of compound (A).

Catalyst (C) is a metal catalyst or a complex of a metal catalyst. Preferably metal catalyst (C) is selected from the group consisting of potassium, lithium, tin, titanium, calcium, sodium, platinum, and rhodium metal catalysts, and complexes thereof. Metal catalysts include the Group VIII metal catalysts and complexes thereof. By Group VIII metal catalyst it is meant herein iron, cobalt, nickel, ruthenium, rhodium, palladium, osmium, iridium and platinum. The metal catalyst (C) can be a platinum containing catalyst compound since they are the most widely used and available. Platinum-containing catalysts can be platinum metal, optionally deposited on a carrier, such as silica gel or powdered charcoal; or a compound or complex of a platinum group metal.

A preferred platinum-containing catalyst is a form of chloroplatinic acid, either as the commonly available hexahydrate form or as the anhydrous form, as taught by Speier, U.S. Pat. No. 2,823,218, incorporated herein by reference. A particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems. Other Group VIII metal catalyst suitable as (C) include $RhCl_3$, $RhBr_3$, and $RhI_3$ and complexes thereof, ClRh $(PPh_3)_3$ and complexes thereof; $H_2PtCl_6$; a complex of 1,3-divinyl tetramethyl disiloxane and $H_2PtCl_6$; and alkyne complexes of $H_2PtCl_6$.

Potassium, lithium, and sodium catalysts as metal catalyst (C) includes hydroxides, silanolates, alcoholates, siloxanolates, and mercaptides of the above Group IA alkali metals.

Potassium catalysts suitable as metal catalyst (C) include potassium hydroxide, potassium silanolate, potassium alcoholate, potassium phenolate, potassium siloxanolate, potassium mercaptide, and potassium polyethers.

Lithium catalysts suitable as metal catalyst (C) include lithium hydroxide, lithium alcoholate, lithium silanolate, lithium siloxanolate, lithium phenolate, lithium mercaptide, anhydrous lithium hydroxide, and lithium polyethers.

Sodium catalysts suitable as metal catalyst (C) include sodium hydroxide, sodium alcoholate, sodium phenolate, sodium silanolate, sodium siloxanolate, and sodium mercaptide.

Tin catalysts suitable as metal catalyst (C) include organotin compounds such as dibutyltin dilaurate, dibutyltin dioctoate, stannous acetate, stannous octoate, stannous benzoate, stannous sebacate, stannous succinate, tin octoate, dibutyltin diacetate, and stannous napthanate.

Titanium catalysts suitable as metal catalyst (C) include organotitanates such as tetraisopropyl titanate, tetrabutyl titanate, tetraethylhexyl titanate, tetraphenyltitanate, triethanolamine titanate, titanium naphthanate, siloxytitanates such as tetrakis(trimethylsiloxy)titanium and bis(trimethylsilloxy) bis(isopropoxy)titanium, and betadicarbonyltitanium compounds such as bis(acetylacetonyl)diisopropyl titanate.

The metal catalyst (C) can be diluted with a solvent prior to adding it to the mixture of step (I). Examples of solvents suitable for dilution of the metal catalysts (C) include aliphatic hydrocarbons such as pentane, hexane, heptane, octane, nonane, and the like; aromatic hydrocarbons such as benzene, toluene, and xylene. The amount of solvent used with the metal catalyst is not critical and can be readily determined by one skilled in the art using routine experimentation. However, it is preferred that catalyst be diluted with from 90 parts of solvent per 10 parts of catalyst to as much as 99 parts of solvent per 1 part of catalyst. When a solvent is used with the metal catalyst (C), it may be necessary to strip off the solvent after the formation of the reaction product. Methods of stripping volatile components are well known in the art and need no extensive delineation herein. Any method of removing volatile components can be used, such methods exemplified by molecular stills, rotoevaporators, and wipe film evaporators, with the preferred method being rotoevaporators.

The most effective concentration of metal catalyst ranges from 0.01 to 1 weight part per 100 parts of compound (A), and it is highly preferred that from 0.01 to 0.20 weight parts per 100 parts of (A) be employed.

When component (A) is organohydrogensilicon compound (i), the reaction mixture of (I) can further comprise an organic compound having at least one group selected from the group consisting of olefinic hydrocarbon radicals having from 2 to 14 carbon atoms, vinyl ether groups, epoxy groups, amine groups, isocyanate groups, oxime groups, acetoxy groups, and mixtures thereof.

Examples of organic compounds containing olefinic hydrocarbon radicals include dienes such as 1,3 hexadiene, 1,5 hexadiene, 1,4 hexadiene, 2,4 hexadiene, propadiene, 1,3-butadiene, 1,3-pentadiene, 1,4-pentadiene, 1,6-heptadiene, 1,7-octadiene, and 1,9-decadiene.

Examples of organic compounds containing vinyl ether groups include hydroxybutylvinylether, hydroxypropylvinylether, p-phenolvinylether, hydroxybutyl-2-methylvinylether, or $H(O(CH_2)_2)_3$—$OCH=CH_2$.

Examples of organic compounds containing epoxy groups include organic epoxides including vinyl or allyl functional epoxides such as 1,2-epoxy-5-hexene, 3,4-epoxy-1-butene, 5,6-epoxy-1-hexene, 7,8-epoxy-1-octene, 11,12-epoxy-1-dodecene, allyl glycidyl ether, 1-methyl-4-isopropenyl cyclohexeneoxide, 1,4-dimethyl-4-vinylcyclohexeneoxide, and 2,6-dimethyl-2,3-epoxy-7-octene.

Examples of organic compounds containing isocyanate groups include unsaturated isocyanates such as allyl isocyanate.

Examples of organic compounds containing amine groups include compounds such as 2-amino-2-methyl-propanol.

It is preferred that from 5 to 200 weight parts of organic compound per 100 parts of compound (A) be employed, and it is highly preferred that from 20 to 100 weight parts per 100 parts of (A) be employed.

The reaction mixture of (I) can further comprise a foam control agent. Preferably the foam control agent is a fluorosilicone polymer. Preferred as the fluorosilicone polymer are the compounds disclosed by Kendziorski in U.S. Pat. No. 4,968,766, incorporated herein by reference to teach fluorosilicone polymers suitable as the foam control agent. Preferred as the foam control agent is a fluorosilicone polymer having the general formula $QMe_2SiO(Me_2SiO)_{c'}$ $(TXMeSiO)_{d'}(MeQSiO)_{e'}SiMe_2Q$ wherein Q denotes an alkenyl radical, Me denotes a methyl radical, TX denotes a silicon-bonded fluorinated radical wherein T denotes a perfluoroalkyl radical having from 4 to 16 carbon atoms, X denotes an alkylene radical linking T to Si through at least 2 carbon atoms, wherein the values of c', d', and e' are such that the fluorosilicone polymer contains at least 5 mol percent $(TX)MeSiO_{1/2}$ siloxane units, and from 0.1 to 10 mol percent alkenyl radical-containing siloxane units. In the above formula Q denotes an alkenyl radical such as vinyl, allyl, butenyl, pentenyl, hexenyl, octenyl, and decenyl. Examples of suitable T groups include groups such as $C_4F_9$—, $C_5F_{11}$—, $C_6F_{13}$—, $C_7F_{15}$—, and $C_8F_{17}$—, which are exemplified by groups such as $CF_3CF_2CF_2CF_2$—, $(CF_3)_2CFCF_2$—, $(CF_3)C$—, $CF_3CF_2(CF_3)CF$—, $CF_3CF_2CF_2CF_2CF_2$—, $CF_3(CF_2)_4CF_2$—, and $CF_3(CF_2CF_2)_3$—. Examples of suitable X groups include —$CH_2CH_2$—, —$CH_2CH_2CH_2$—, —$CH(CH_3)CH_2$—, —$(CH_2CH_2)_2$—, —$CH(CH_3)CH_2CH_2$—, and —$CH_2(CH_3)CHCH_2$—. In the formula hereinabove TX preferably denotes the group $CF_3CF_2CF_2CF_2CH_2CH_2$—. In the above formula, c' and e' can have a value as small as zero, but d' must have a value of at least one. Preferably c'+d'+e' has a value of 2500, d' has a value of 750, and e' has a value of 12.5.

It is preferred that from 0.01 to 5 weight parts per 100 parts of compound (A) be employed, and it is highly preferred that from 0.01 to 0.1 weight parts per 100 parts of (A) of foam control agent be employed.

The method of the present invention can further comprise neutralizing the reaction product of step (I). Methods of neutralizing solutions are well known in the chemical arts and need no extensive delineation herein. Neutralization of the reaction product of Step (I) can be accomplished by adding a compound such as acetic acid, chlorosilanes, and carbon dioxide, to the reaction product in an amount sufficient to render the solution neutral (i.e. attain a pH of close to 7). It is highly preferred that when a basic catalyst is employed as metal catalyst (C) that the reaction product of step (I) be neutralized. Preferably the above neutralizing compounds are added in a range of 0.01 to 1 weight parts per 100 weight parts of the reaction product of step (I).

The method of the present invention can further comprise filtering the reaction product of step (I). Filtration for purposes of this invention denotes the separating of suspended solids from a liquid by forcing the mixture through a porous barrier. Methods of filtering solutions are well known in the chemical arts and need no extensive delineation herein. Filtration of the product of Step (I) can be accomplished by employing filters such as gravity filters, pressure filters, vacuum filters or suction filters. It is highly preferred that when metal catalyst (C) is a platinum-containing catalyst that the reaction product of step (I) is filtered.

The reaction mixture of (I) can further comprise a monohydric alcohol (an alcohol having 1 OH group) having from 1 to 30 carbon atoms. Preferably the alcohol is an alcohol containing olefinic unsaturation. The alcohols are preferably monohydric alcohols such as aliphatic, alicyclic, aromatic, heterocyclic, or polycyclic alcohols. Alcohols suitable for use include methanol, ethanol, 1-propanol, 2-propanol, 1-butanol, 1-hexanol, 1-heptanol, phenol, benzyl alcohol, 1-octanol, 1-nonanol, 1-decanol, undecylenyl alcohol, 2,4-dichlorobenzyl alcohol, phenethyl alcohol, 1-undecanol, 2-methylbenzyl alcohol, 3-methylbenzyl alcohol, 2-phenyl-1-propanol, stearyl alcohol, furfuryl alcohol, tetrahydrofurfuryl alcohol, sterols, cyclohexanol, allyl alcohol ($CH_2=CHCH_2OH$), crotyl alcohol ($CH_3CH=CHCH_2OH$), methylvinylcarbinol ($CH_2=CHCH(OH)CH_3$), cinnamyl ($C_6H_5CH=CHCH_2OH$), 5-decen-1-ol ($CH_3(CH_2)_3CH=CH(CH_2)_4OH$, 9-decen-1-ol ($H_2C=CH(CH_2)_8OH$), 2-methyl-3-buten-1-ol ($H_2C=CHCH(CH_3)CH_2OH$), 2-methyl-3-buten-2-ol ($H_2C=CHC(CH_3)_2OH$), 3-methyl-2-buten-1-ol (($CH_3)_2C=CHCH_2OH$), 3-methyl-3-buten-1-ol ($H_2C=C(CH_3)CH_2CH_2OH$), 2-propenylphenyl ($CH_3CH=CHC_6H_4OH$), 1-octen-3-ol ($CH_3(CH_2)_4CH(OH)CH=CH_2$), 7-dodecen-1-ol ($CH_3(CH_2)_3CH=CH(CH_2)_6OH$), 7-tetradecen-1-ol ($CH_3(CH_2)_5CH=CH(CH_2)_6OH$), 9-tetradecen-1-ol ($CH_3(CH_2)_3CH=CH(CH_2)_8OH$), 11-tetradecen-1-ol ($C_2H_5CH=CH(CH_2)_{10}OH$), 11-hexadecen-1-ol ($CH_3(CH_2)_3CH=CH(CH_2)_{10}OH$), and oleyl alcohol ($HO-(CH_2)_8-CH=CH(CH_2)_7CH_3$). It is preferred that the alcohol is an unsaturated monohydric alcohol having greater than 10 carbon atoms in its molecular chain.

The amount of alcohol employed varies depending on the amount of components (A), (B), and (C) (delineated hereinabove) that is employed. It is preferred that from 0 to 50 weight parts of alcohol be used, and it is highly preferred that from 5 to 25 weight parts be employed, said weight parts being based on 100 parts of compound (A).

The method of the present invention can further comprise adding, after step (I), a silicone glycol copolymer having its general formula selected from the group consisting of

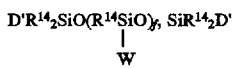

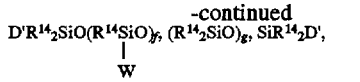

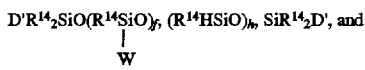

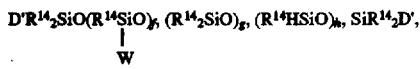

wherein $R^{14}$ is a monovalent hydrocarbon radical having from 1 to carbon atoms, D' is $R^{14}$ or W, f' has a value of 1 to 20, g' has a value of 1 to 200, h' has a value of 1 to 200, W is a polyoxyalkylene group having its average structure selected from

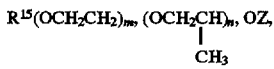

wherein $R^{15}$ is selected from a divalent hydrocarbon group having 1 to 20 carbon atoms or a urethane group, m' has a value of 1 to 50, n' has a value of 1 to 50, and Z is selected from the group consisting of hydrogen, an alkyl radical having 1 to 6 carbon atoms and an acyl group having 2 to 6 carbon atoms with the proviso that the value of m'+n' is greater than 5. It is preferred that f' is between 1 and 10, g' is between 1 and 100, m' is between 1 and 25, and n' has a value of 1 to 50. The monovalent hydrocarbon groups of $R^{14}$ and the divalent hydrocarbon groups of $R^{15}$ are as delineated above. It is preferred that both D' and $R^{14}$ are methyl radicals and that $R^{15}$ is ethylene or trimethylene.

The urethane group of $R^{15}$ is exemplified by a group having the formula $-R^{16}CO(NH_2)OC_2H_5-$ wherein $R^{16}$ is a divalent hydrocarbon radical as described above.

The amount of silicone glycol copolymer employed varies depending on the amount of components (A), (B), and (C) (delineated hereinabove) that is employed. It is preferred that from 0.50 to 50 weight parts of silicone glycol copolymer be used, and it is highly preferred that from 1 to 10 weight parts be employed, said weight parts being based on 100 weight parts of the reaction product of step (I).

The reaction mixture of (I) can further comprise water. The amount of water to be added is not critical and can be readily determined by routine experimentation. It is preferred that water comprise less than 1 weight part, said weight parts being based on the total weight of the reaction product.

The method of making the aerosol suppressant compositions of this invention can further comprise heating the reaction mixture of step (I) and any optional compounds. Heating of the mixture of step (I) is optional, however, if heat is applied it is preferred that the mixture of (I) including any optional components is heated at a temperature range of 20° C. to 200° C. and more highly preferred is that the mixture be heated at a temperature range of 100° to 150° C.

Compounds (A) and (B), metal catalyst (C), and any optional components can be mixed together using any suitable mixing means, such as a spatula, a drum roller, a mechanical stirrer, a three roll mill, a sigma blade mixer, a bread dough mixer, and a two roll mill. Compounds (A) and (B), and metal catalyst (C) can be prepared by homogeneously mixing (A), (B), and (C) and any optional compounds in any order. The order of mixing (A) to (C) and any optional components is not critical however it is preferred that metal catalyst (C) be brought together in the presence of compounds (A) and (B). It is highly preferred to mix compounds (A), (B), and any optional compounds in a preliminary mixing step followed by addition of metal catalyst (C). Mixing of compounds (A), (B), any optional compounds, and metal catalyst (C) results in the formation of a reaction product.

The present invention is further related to a method of making a curable silicone coating composition comprising adding to a curable silicone coating composition an aerosol suppressant composition prepared according to the method described hereinabove.

The organosilicon compounds (i), (ii), and (iii) of compound (A) and metal catalyst (C) are as delineated above in the method of preparing the aerosol suppressant compositions of this invention including preferred embodiments and preferred amounts thereof.

Compound (B) is as delineated above for the aerosol suppressant compositions of this invention including preferred embodiments and amounts thereof. However, in the method of making the curable coating compositions of this invention, R in compound (B) can be the same or different as desired. It is preferred however that the group R is the same on both molecular chain ends of Compound (B).

Compounds suitable as (B) in this aspect of the invention include compounds having their formula selected from the group consisting of

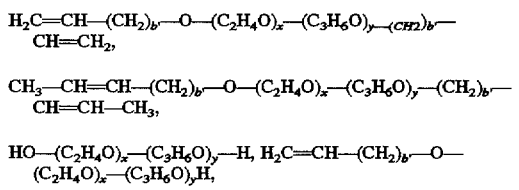

and

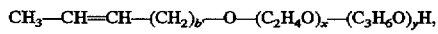

wherein b', x, and y are as delineated hereinabove.

The curable silicone coating compositions can be any of the known curable silicone coating compositions known in the art. Thus the curable silicone coating composition can comprise the well known System D coating compositions such as those disclosed in U.S. Pat. Nos. 5,281,656, 5,036,117, 4,609,574, 4,774,111, 4,562,096, 4,256,870, 3,445,420, 4,476,166, 4,980,440, 4,736,048, 4,954,554, 5,095,067, 5,104,927, 4,961,963, 4,559,396, 4,465,818, and 4,472,563 incorporated herein by reference to teach curable silicone coatings which are suitable. This list is not intended as a restriction on the type of curable silicone coatings which the aerosol suppressant compositions can be added to but is disclosed to exemplify the curable silicone coating compositions suitable for use in this method of the instant invention.

Thus suitable curable silicone coating compositions suitable include compositions which comprise (i) an organosilicon compound having at least two groups selected from the group consisting of olefinic hydrocarbon radicals having from 2 to 14 carbon atoms and hydroxyl groups, (ii) an organohydrogensilicon crosslinking agent, (iii) a metal catalyst, and (iv) an inhibitor.

The olefinic hydrocarbon radicals and hydroxyl groups are as delineated above in the method of preparing the aerosol suppressant compositions of this invention including preferred embodiments thereof. Preferred olefinic hydrocarbon containing polydiorganosiloxanes for use as organosilicon compound (i) include the olefinic functional organopolysiloxanes delineated above in the method of making the aerosol suppressant compositions of this invention including preferred embodiments thereof. It is especially preferred that polydiorganosiloxanes contain either vinyl functional groups or 5-hexenyl functional groups.

It is preferred that from greater than zero to 95 weight parts of (i) be used, and it is highly preferred that from 90 to 99 weight parts of (i) be employed, said weight parts being based on the total weight of the curable silicone coating composition.

The organohydrogenpolysiloxanes for component (ii) are as delineated above in the method of making the aerosol suppressant compositions of this invention including preferred embodiments thereof.

It is preferred that from 1 to 20 weight parts of component (ii) be used, and it is highly preferred that from 1 to 5 weight parts of component (ii) be employed, said weight parts being based on the total weight of the curable silicone coating composition.

Component (iii) can be any platinum group metal-containing catalyst component. By platinum group it is meant herein ruthenium, rhodium, palladium, osmium, iridium and platinum and complexes thereof. The platinum group catalysts suitable for the curable silicone coating compositions are the same as the platinum catalysts delineated above in the method of making the aerosol suppressant compositions of this invention including preferred embodiments thereof. Preferred platinum-containing catalysts include chloroplatinic acid, either in hexahydrate form or anhydrous form, and chloroplatinic acid which is reacted with an aliphatically unsaturated organosilicon compound such as divinyltetramethyldisiloxane. Preferably component (iii) is present in an amount at 0.01 to 1 weight parts, and it is highly preferred to use from 0.1 to 0.5 weight parts, said weight parts being based on the total weight of the curable silicone coating composition.

The inhibitor (iv) can be any material that is known to be, or can be, used to inhibit the catalytic activity of platinum group metal-containing catalysts. By the term "inhibitor" it is meant herein a material that retards the room temperature curing of a curable mixture of Components (i), (ii), and (iii), when incorporated therein in small amounts, such as less than 10 parts by weight of the composition, without preventing the elevated curing of the mixture. Examples suitable inhibitors include ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitriles, and diaziridines.

Preferred inhibitors include acetylenic alcohols such as those disclosed in U.S. Pat. No. 3,445,420, including ethynylcyclohexanol and methylbutynol, unsaturated carboxylic esters such as diallyl maleate and dimethyl maleate, maleates and fumarates such as those disclosed in U.S. Pat. Nos. 4,562,096 and 4,774,111, including diethyl fumarate, diallyl fumarate, and bis-(methoxyisopropyl) maleate, and conjugated ene-ynes such as those disclosed in U.S. Pat. Nos. 4,465,818, 4,472,563, and 4,559,396. The above-mentioned patents are incorporated herein by reference to teach how to prepare compounds which are suitable for use as an inhibitor in the compositions of this invention. Maleates and fumarates are the preferred inhibitors for the compositions of this invention. More particularly, bis-methoxyisopropyl maleate and diethyl fumarate are preferred as inhibitors for the present invention. It is preferred that from 0.02 to 10 weight parts of inhibitor be added to the total curable silicone coating composition and it is highly preferred that from 0.02 to 1 weight part be used, said weight parts being based on the total weight of the curable silicone coating composition.

The curable coating compositions can additionally comprise (v) a bath life extender compound in a total amount sufficient to further retard the curing reaction at room temperature such as those described in Chung et al., U.S. Pat. No. 5,036,117 incorporated herein by reference. Examples of suitable bath life extender compounds include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2- methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for the compositions of this invention. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

The amount of bath life extender (v) that is to be used can be as high as 10 parts or more by weight. Preferably, the amount of bath life extender to be used falls within the range of 0.01 to 5 parts, and most preferably 0.01 to 1 part by weight, based on the total weight of the curable silicone coating composition.

The curable silicone coating compositions can further comprise a solvent. Examples of solvents include aliphatic hydrocarbons such as pentane, hexane, heptane, octane, nonane, and the like; aromatic hydrocarbons such as benzene, toluene, and xylene; ketones such as acetone, methylethyl ketone, and methylisobutyl ketone, and halogenated diluents such as fluorine-, chlorine-, and bromine-, substituted aliphatic or aromatic hydrocarbons such as trichloroethane, perchloroethylene, bromobenzene, and the like. Two or more solvents may be used together.

The amount of solvent is not critical and may be readily determined by one skilled in the art. The curable silicone coating compositions of this invention may contain up to 99 weight parts of solvent, however it is preferred that the solvent, if employed, ranges from 70 to 90 weight parts of the composition, said weight being based on the total weight of the curable silicone coating composition.

The curable silicone coating compositions can further comprise a high release additive. Any of the well known high release additives in the art may be employed. The high release additive is preferably a vinyl functional MQ resin (silicone resins consisting of monovalent (M) units $(R^{17}{}_3SiO_{1/2}$ wherein $R^{17}$ is selected from the group consisting of olefinic hydrocarbon groups as delineated hereinabove, monovalent hydrocarbon groups free of aliphatic unsaturation as delineated above, and a mixture of these groups) and quadrivalent (Q) $SiO_2$ units) diluted with a linear olefinic containing siloxane polymer such as those delineated above (i.e. vinyl or hexenyl functional polydiorganosiloxanes). The high release additive preferably comprises 40 to 70 weight parts of the vinyl functional MQ resin and 30 to 60 weight parts of the olefinic containing siloxane polymer. From 1 to 99 weight parts of the high release additive may be employed in the curable coatings of the present invention, and preferably 1 to 10 weight parts of high release additive is employed, said weight being based on the total weight of the curable silicone coating.

The curable silicone coating compositions can contain any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, adhesive-release modifiers, etc.

The curable silicone coating can also be any of the radiation curable silicone coating compositions known in the art such as UV (ultraviolet) or EB (electron beam) curable silicone coatings. Thus the curable silicone coating composition can comprise any of the well known radiation curable silicone coating compositions of the art such as those disclosed in U.S. Pat. No. 4,617,238 to Crivello, U.S. Pat. No. 5,057,549 to Herzig et al., European Patent Publication No. 0462389, Canadian Patent Application No. 2,035,369, U.S. Pat. No. 5,145,915, PCT Patent Application No. 9322369, U.S. Pat. Nos. 5,270,423 and 5,331,020 to Brown et al., incorporated herein by reference to teach suitable radiation curable silicone coatings. This list is not intended as a restriction on the type of radiation curable coatings which the aerosol suppressant compositions of this invention can be added to but is disclosed to exemplify suitable radiation curable silicone coatings.

Thus the curable silicone coating composition can also comprise (i) a radiation curable organosilicon compound having at least two groups selected from the group consisting of epoxy groups, vinyl ether groups, acrylamide groups, acrylate groups, and olefinic hydrocarbon radicals having from 2 to 14 carbon atoms; and (ii) an initiator. Preferably the organosilicon compound (i) is selected from the group consisting of vinylether-containing polyorganosiloxanes, epoxy-containing organopolysiloxanes, acrylate-containing organopolysiloxanes, acrylamide-containing organopolysiloxanes, vinyl-containing organopolysiloxanes, and hexenyl-containing organopolysiloxanes. The vinylether-containing polyorganosiloxanes, epoxy-containing organopolysiloxanes, and olefinic hydrocarbon containing organopolysiloxanes are as delineated above in the method of making the aerosol suppressant compositions of this invention including preferred embodiments thereof.

Preferred acrylate functional organopolysiloxanes have the general formula

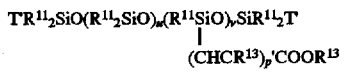

wherein $R^{11}$ and $R^{13}$ are as defined above, T' denotes $R^{11}$ or —$(CHCR^{13})p'COOR^{13}$, u and v are as defined above, p' has a value of 1 to 10, with the proviso that there are at least two —$(CHCR^{13})p'COOR^{13}$ groups per compound. Preparation of such compounds is well known in the organosilicon art and needs no extensive delineation herein.

Acrylamide functional organopolysiloxanes suitable as organosilicon compound (i) have been disclosed in U.S. Pat. Nos. 4,608,270, 4,831,064, 4,911,986, 5,017,717, 5,082, 958, and 5,087,716 incorporated herein by reference to teach acrylamide functional organopolysiloxanes which can be used as radiation curable organosilicon compound (i) in the curable coating compositions. Preferred acrylamide-containing organopolysiloxanes have the general formula

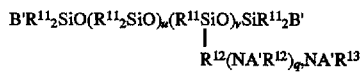

$$R^{12}(NA'R^{12})_q NA'R^{13}$$

wherein $R^{11}$, $R^{12}$, and $R^{13}$ are as defined above, q' has a value of 0 or 1, B' denotes $R^{11}$ or —$R^{12}(NA'R^{12})_q NA'R^{13}$, u and v are as defined above, A' denotes an acyl radical selected from —C(O)CH=CH$_2$ or —C(O)C(CH$_3$)=CH$_2$, with the proviso that there are at least two —$R^{12}(NA'R^{12})_q NA'R^{13}$ groups per compound. Preparation of such compounds is well known in the organosilicon art and needs no extensive delineation herein.

It is preferred that from 95 to 99.5 weight percent of the radiation curable organosilicon compound (i) be used in the radiation curable coating compositions of the invention, and it is highly preferred that from 97 to 99 weight percent of this compound be employed, said weight percent being based on the total weight of the radiation curable silicone coating composition.

Compounds suitable as the initiator (ii) include photoinitiators and sensitizers. Sensitizers have been described in great detail in the art in numerous publications and include materials such as the well known material benzophenone. Suitable initiators include onium salts, certain nitrobenzyl sulfonate esters, diaryliodonium salts of sulfonic acids, triarylsulfonium salts of sulfonic acids, diaryliodonium salts of boronic acids, and triarylsulfonium salts of boronic acids.

Suitable onium salts as (ii) in the radiation curable silicone coatings of this invention have the formulae $R^{18}_n I^+ M'X'_n{}^-$, $R^{18}_3 S^+ M'X'_n{}^-$, $R^{18}_3 Se^+ M'X'_n{}^-$, $R^{18}_4 P^+ M'X'_n{}^-$, and $R^{18}_4 N^+ M'X'_n{}^-$, wherein $R^{18}$ is the same or different organic radicals having from 1 to 30 carbon atoms, including aromatic carbocyclic radicals of from 6 to 20 carbon atoms which can be substituted with from 1 to 4 monovalent hydrocarbon radicals selected from alkoxy radicals having from 1 to 8 carbon atoms, alkyl radicals having from 1 to 8 carbon atoms, nitro, chloro, bromo, cyano, carboxyl, mercapto, and aromatic heterocyclic radicals including pyridyl, thiophenyl, pyranyl, etc. The symbol M' in the formulae hereinabove are metals or metalloids which include transition metals such as such as Sb, Fe, Sn, Bi, Al, Ga, In, Ti, Zr, Sc, V, Cr, Mn, Cs, rare earth metals such as the lanthanides, for example, Cd, Pr, Nd, etc., and metalloids such as B, P, As, etc. $M'X'_n{}^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, $FeCl_4^=$, $SnCl_6^=$, $BiCl_5^=$, and the like.

Bis-diaryl iodonium salts, such as bis(dodecyl phenyl) iodonium hexafluoroarsenate and bis(dodecylphenyl) iodonium hexafluoroantimonate, and dialkylphenyl iodonium hexafluoroantimonate are preferred. Nitrobenzyl sulfonate esters which are useful as photoinitiators in the compositions of the present invention have the general formula

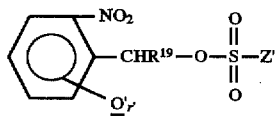

wherein Z' is selected from the group consisting of alkyl groups, aryl groups, alkylaryl groups, halogen substituted alkyl groups, halogen substituted aryl groups, halogen substituted alkylaryl groups, nitro substituted aryl groups, nitro substituted alkylaryl groups, aryl groups having nitro and halogen substituents, alkylaryl groups having nitro and halogen substituents, and a group having the formula —$C_6H_4SO_3CHR^{19}C_6H_{4-r}Q'_r(NO)_2$, $R^{19}$ is selected from the group consisting of hydrogen, methyl, and nitro substituted aryl groups, each Q' is independently selected from the group consisting of hydrocarbon groups, hydrocarbonoxy groups, NO$_2$, halogen atoms, and organosilicon compounds, r' has a value of 0, 1, or 2, with the proviso that Q' is not an acidic group. These nitrobenzyl sulfonate photoinitiators are described in copending U.S. application for patent, Ser. No. 976,111, filed Nov. 13, 1992, which is incorporated herein by reference.

Diaryliodonium salts of sulfonic acids, triarylsulfonium salts of sulfonic acids, diaryliodonium salts of boronic acids, and triarylsulfonium salts of boronic acids are also suitable as initiator (ii) in the radiation curable silicone coatings. Preferred diaryliodonium salts of sulfonic acid are selected from diaryliodonium salts of perfluoroalkylsulfonic acids and diaryliodonium salts of aryl sulfonic acids. Preferred diaryliodonium salts of perfluoroalkylsulfonic acids include diaryliodonium salts of perfluorobutanesulfonic acid, diaryliodonium salts of perfluoroethanesulfonic acid, diaryliodonium salts of perfluoro-octanesulfonic acid, and diaryliodonium salts of trifluoromethane sulfonic acid. Preferred diaryliodonium salts of aryl sulfonic acids include diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid are selected from triarylsulfonium salts of perfluoroalkylsulfonic acids or triarylsulfonium salts of aryl sulfonic acids. Preferred triarylsulfonium salts of perfluoroalkylsulfonic acids include triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids include triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids, and triarylsulfonium salts of boronic acids are compounds such as those disclosed in European Patent Application No. 0562922. Preferred diaryliodonium salts of boronic acids include diaryliodonium salts of perhaloarylboronic acids and preferred triarylsulfonium salts of boronic acids are the triarylsulfonium salts of perhaloarylboronic acid.

The initiators (ii) may be present in any proportions which effect curing in the compositions of this invention. Preferably the amount of initiator is from 0.1 to 10 weight percent based on the total weight of the composition, and it is highly preferred to use between 1 and 5 weight percent based on the total weight of the radiation curable silicone coating composition.

The radiation curable silicone coatings can further contain optional ingredients such as photosensitizers, fillers, high release additives, reactive diluents such as organic vinyl ethers, photochromic materials, dyes, colorants, preservatives, fragrances, and other radiation curable compounds may be included in the composition. Preferably no more than 25 parts by weight of the composition is occupied by optional ingredients.

The aerosol suppressant composition is added to the curable silicone coating composition in amount sufficient to reduce the mist (aerosol) of the coating during high speed processes which can readily be determined by one skilled in the art through routine experimentation. It is preferably added to the curable silicone coating composition in an amount of 0.5 to 50 weight parts, and it is highly preferred that the aerosol suppressant composition is added in an amount of 1 to 3 weight parts, said weight parts being based on 100 weight parts of the curable silicone coating composition.

The method of making the curable silicone coating compositions of the present invention can further comprise neutralizing the reaction product after step (I). Methods of neutralizing the reaction product of step (I) are as delineated above for in the method of making the aerosol suppressant compositions of this invention including preferred embodiments thereof.

The method of making the curable silicone coating compositions of the present invention can further comprise filtering the reaction product of step (I). Methods of filtering the reaction product of Step (I) are as delineated above in the method of making the aerosol suppressant compositions of this invention including preferred embodiments thereof.

The reaction mixture of (I) can further comprise a monohydric alcohol having from 1 to 30 carbon atoms. The alcohol is as delineated hereinabove in the method of making the aerosol suppressant compositions of this invention, including preferred embodiments and preferred amounts thereof.

The method of making the curable silicone coating compositions of the present invention can further comprise the step of adding a silicone glycol copolymer after step (I). The silicone glycol copolymer is preferably added to the reaction product of step (I) (i.e. after the reaction has gone to completion). The silicone glycol copolymer is as delineated hereinabove in the method of making the aerosol suppressant compositions of this invention, including preferred embodiments and preferred amounts thereof.

The reaction mixture of (I) can further comprise water. It is preferred that water comprise less than 0.1 weight part of the total reaction product.

The method of making the curable silicone coating compositions of this invention can further comprise heating the reaction mixture of step (I). Heating of the reaction mixture of (I) is optional, however, if heat is applied it is preferred that the mixture is heated at a temperature range of 20° C. to 200° C. and more highly preferred is that the mixture be heated at a temperature range of 100° to 150° C.

When component (A) is organohydrogensilicon compound (i), the reaction mixture of (I) can further comprise an organic compound having at least one group selected from the group consisting of olefinic hydrocarbon radicals having from 2 to 14 carbon atoms, vinyl ether groups, epoxy groups, amine groups, isocyanate groups, oxime groups, acetoxy groups, and mixtures thereof to the mixture of step (I). The organic compounds are as delineated hereinabove for the aerosol suppressant compositions of this invention including amounts and preferred embodiments thereof.

The reaction mixture of (I) can further comprise a foam control agent. Preferably the foam control agent is a fluorosilicone polymer. The fluorosilicone polymers are as delineated hereinabove for the aerosol suppressant compositions of this invention including amounts and preferred embodiments thereof.

The present invention further relates to a method of suppressing mist in a curable silicone coating composition, comprising adding a liquid having a surface tension of greater than or equal to 25 dynes/centimeter to the curable silicone coating composition. It has been found through extensive experimentation that liquids having a surface tension of at least 25 dynes/centimeter act to suppress mist in silicone coatings. Liquids meeting this criteria and thus capable of reducing mist in silicone coatings includes benzyl alcohol, polyethylene glycol, ethylene glycol, glycerol, 1,2-propanediol, and water. The amount of liquid in the curable silicone coating preferably ranges from 5 to 20 weight parts per 100 weight parts of curable silicone coating, and it is highly preferred that the liquid comprises from 5 to 10 weight per 100 weight parts of curable silicone coating.

The present invention also relates to a method of improving the anchorage of a curable silicone coating composition to a substrate, comprising adding the aerosol suppressant composition prepared according to the method described hereinabove to the curable coating composition and then applying and curing the curable coating composition on said substrate.

The present invention further relates to a method of making a cured coating, the method comprising the steps of: (I) adding an aerosol suppressant composition to a curable silicone coating composition; (II) coating the mixture from (I) on the surface of a substrate; (III) exposing the coating and the substrate to atmospheric moisture or an energy source selected from the group consisting of (i) heat and (ii) actinic radiation in an amount sufficient to cure the coating, wherein the aerosol suppressant composition is prepared according to the method described hereinabove. Compound (B) is as delineated above in the method of making the curable coating compositions of this invention including preferred embodiments thereof (i.e. the R group can be the same or different as desired but is preferably identical on the molecular chain ends of compound (B)). This method can further comprise applying a pressure sensitive adhesive on the coating after step (III).

By actinic radiation it is meant ultraviolet light; electron beam radiation; and alpha-, beta-, gamma- and x-rays. By heat it is meant infrared radiation, hot-air, microwave radiation, etc. Of course actinic radiation is frequently accompanied by heat and the use of a combination of the two falls within the scope and spirit of the present process. In the preferred process of this invention, the coating process can be accomplished by any suitable manner known in the art, such as by spreading, brushing, extruding, spraying, gravure, kiss-roll and air-knife.

In a preferred embodiment of the instant process the solid substrate is a flexible sheet material such as paper, polyolefin film and polyolefin-coated paper or foil. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the solid substrate can be substantially sheet-like, such as a peelable release liner for pressure sensitive adhesive; a fabric or a foil; or substantially three-dimensional in form.

After the liquid curable composition has been coated onto a substrate it is heated and/or irradiated with actinic radiation, as noted herein, to cure the liquid coating and to adhere it to the substrate.

In a preferred embodiment of the process of this invention, a flexible sheet material, such as paper, metal foil or tapestock, is coated with a thin coating of the liquid curable composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide-or platinum-curable polydiorganosiloxane-based adhesives.

The process of this invention is also applicable to adhesive materials, other than pressure sensitive adhesives. Examples of said adhesive materials include foods, graphite composites, asphalt and gum polymers.

The following examples are disclosed to further teach, but not limit, the invention which is properly delineated by the appended claims. All amounts (parts and percentages) are by weight unless otherwise indicated.

To analyze and quantify the silicone mist in a reproducible manner a laboratory 2-roll coater capable of running over 2,000 ft/min of line speed was built. Once we were able to generate the mist in a controlled manner a sophisticated particle size analyzer was attached to the machine to characterize the mist.

The 2-roll coater was equipped two 6 inch diameter rollers (bottom roll:rubber coated and top roll:chrome coated), two blades, one on each roll, and a bottom pan for containing the liquid supply. The rubber coated bottom roll was driven by variable speed motor which can cover over 2,000 ft/min. of line speed. The top roll was a nipping roll which is engaged with bottom roll by applying pressure. Since the measurement of mist is very sensitive to the environment the whole system was located in a hood and the hood fan speed was kept low to minimize the influence of turbulence of the hood to the measurement. A vacuum cleaner was attached to each roll surface by using a coat hanger type accessory to sweep the mist away once it passed the measuring point. The coating liquid was supplied either from the button pan or a dam on the top blade against the top metal roller. The bottom pan feeding method was employed for all data reported herein. To obtain consistent results, the pressure settings of top blade and top roller were kept at 10 and 50 psi, respectively and the bottom blade was used as a doctoring blade to regulate the amount of incoming fluid. The coater was made by Euclid Tool and Machines, Bay City, Mich.

The air borne silicone particles produced by the "mist generator" described hereinabove were drawn to a QCM Cascade Impactor (TM), (Model PC-2 Ten Stage QCM Cascade Impactor, California Measurements, Inc., Sierra Madre, Calif.) and analyzed. A complete analysis of aerosol mass concentration and size distribution was obtained from a sample of air taken for a short period of time (10 seconds to 1 minute). Collected samples of the sized particles were retained undisturbed (if the particles are solid) and were used directly to obtain composition, size and shape (for solid particles only) information using auxiliary scanning electron microscopy (SEM) and other analytical techniques.

The instrument separates aerosol particles into 10 sizes from 0.05 to 25 micrometers. It does this by drawing the aerosol-laden air sample through a series of 10 stages, each stage containing an inertial impactor jet of decreasing size (various size of orifices) where the particles are accelerated. Directly below each jet was a piezoelectric quartz crystal that was used as an impactor to collect the separated particles. As the jet of air exits from the nozzle it was forced to turn sharply to flow around the crystal. Larger particles in the stream, because of their inertia, continue to travel toward the crystal plate and impact on it. Smaller particles follow the flow of air around the crystal to the next stage, which was a repeat of the proceeding stage, except it was equipped with smaller nozzle designed to impact smaller particles. The 10 stages thus collect particles of smaller and smaller sizes. Each crystal was the frequency-controlling element of a quartz-crystal microbalance (QCM), whose output frequency decreases when particles are collected on the surface. Placed in close proximity to the sensing crystal, but shielded from the collected particles, was an identical reference crystal controlling the frequency of another circuit set about 2 kHz higher than that of the sensing crystal. The set of crystals in a stage were closely matched in frequency.

The beat frequency between the two oscillators was the signal indicative of the mass collected. The particle size distribution was obtained by monitoring the frequency change of QCM in each of the 10 stages.

A tip of stainless steel tube (¼' in diameter) remoted from the QCM Cascade Impactor (TM) was placed very closely to the nip point of the mist generator. To start the measurement the Cascade Impactor was initialized by pushing the initialization button on the front panel of the control unit. The mist generator was set at a speed (either 1,000, 1,500 or 2,000 ft/min) and allowed to run for 10 seconds before taking the sample and then open the sampling knob of the Impactor for a predetermined period time (10 to 30 seconds). After sampling the Impactor was left to idle for additional 50 seconds to let the particles settle in the stages. The amount of collected particles at each stage was calculated by pushing the "final" button on the front panel. The result of the total amount of mist and particle size distribution is printed out to both the CRT of the PC connected via the serial port and the thermal printer on the controller. The data was taken from at least average of three individual runs at a speed. When the individual data scattered too much two more measurements were made and then the two extreme values (1 highest and 1 lowest) were discarded before the results were averaged.

Tests were also conducted on a 12" forward roll coater. On a five 12 inch diameter production scale forward roll coater the QCM cascade impactor was installed to measure the amount of mist produced at 1,500 ft/min line speed. The tip of stainless steel tube (¼ inch id.) for sample collection was located at 1 inch away from the nip point of the applicator and nipping rollers of the coater. The coater was run for 10 seconds at 1,500 ft/min and then the mist sample was taken for additional 10 seconds. Two to three data points were taken at a condition and then the average was taken as a result. The average variations were less than 15% of the mean values. In the Examples hereinbelow, Me denotes methyl, Hex denotes hexenyl, and Ac denotes acetyl.

EXAMPLES 1–12

In the examples hereinbelow, the aerosol suppressant effect of the compositions of the instant invention were tested. Into a 500 ml 3-neck flask were added about 100 parts of a trimethylsiloxy-endblocked-polydimethylsiloxane-methylhydrogensiloxane copolymer having a total average degree of polymerization of about 12 and about 50 mole percent methylhydrogen moiety on the siloxane chain, about 0.01 parts of a dimethylvinylsiloxy-endblocked polydimethylsiloxane-polymethylperfluorobutylethylsiloxane-methylvinylsiloxane copolymer having a degree of polymerization of about 300, and about 10 parts (15 parts in Example 10) of polypropylene glycol having an average molecular weight of about 2000. In examples 5–12 an amount of oleyl alcohol or stearyl alcohol was added to this mixture, the type and amount (parts per 100 parts of methylhydrogensiloxane copolymer) of alcohol are denoted in Table I hereinbelow. Next, the mixture was heated to a temperature of from about 120° to 130° C. and this temperature was maintained for about 30 minutes. During this time the mixture in the flask was stirred and purged with nitrogen gas. The reaction temperature was then cooled down to room temperature. Next, in Examples 1–4, about 0.05 parts of a 1 percent by weight solution of potassium silanolate in toluene was added to this mixture with stirring and this mixture was then purged with nitrogen gas in the flask. In Examples 5–12 however, about 0.05 parts of a 10 percent by weight solution of potassium silanolate in xylene was added to the mixture with stirring and the mixture then purged with nitrogen gas in the flask. Additional catalyst was then added to the mixture at room temperature to increase the viscosity of the reaction product until a target viscosity was obtained. When the viscosity of the reaction product reached the target viscosity, small pieces of dry ice were added to the flask to neutralize the basic catalyst. The neutralized salt was then removed through a pressure filter. In examples 3 and 4, about 5 parts of a silicone glycol copolymer having the average formula:

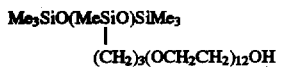

was added to 100 parts of the above reaction product.

About 2 parts of the above prepared reaction product was then added to about 100 parts of two types of Curable Coatings, A and B which are delineated hereinbelow. Curable Coating A comprised 100 parts of an organopolysiloxane having the general formula HexMe$_2$SiO(Me$_2$SiO)$_a$(MeHexSiO)$_b$SiMe$_2$Hex wherein said organopolysiloxane has about 2 mole percent hexenyl groups and an average degree of polymerization of about 150. Curable Coating B comprised a mixture of 97.4 parts of Curable Coating A delineated hereinabove, 1.8 parts of a platinum catalyst (a soluble platinum complex containing 0.67% platinum formed from chloroplatinic acid and divinyltetramethyldisiloxane), 0.8 parts of bis(2-methoxy-1-methylethyl) maleate, and about 4.1 parts of a trimethylsiloxy-endblocked-polydimethylsiloxane-methylhydrogensiloxane copolymer having a total average degree of polymerization of about 40 and about 70 mole percent methylhydrogen moiety on the siloxane chain. The curable silicone coatings containing the reaction product of the instant invention were then tested for the amount of silicone mist generated off of a coater as described hereinabove. The results of this test are delineated in Table I hereinbelow. In all of the Examples in Table I, except for Example 1, high shear was applied for about 5 minutes to the Curable Coatings by using a Turrax (TM) mixer prior to the coating being tested for mist. In examples 1 and 2, only the reaction product of the instant invention was added to the curable coating, no alcohol or silicone glycol copolymer was employed during the formation of the reaction product in these two examples. As a comparison, the amount of mist generated by Curable Coating A and B without the reaction product of this invention was also measured and this is denoted in Table I as the Comparison (Comp.) Coating.

TABLE I

| | | Additive | | Total Mist (mg/m$^3$) | | | |
| | | | | 1500 ft/min. | | 2000 ft/min. | |
| Ex. | Curable Coating | Type | Amount (parts) | Invention | Comp. Coating | Invention | Comp. Coating |
| --- | --- | --- | --- | --- | --- | --- | --- |
| 1 | A | — | 0 | 0.05 | 3.69 | 0.12 | 8.19 |
| 2 | A | — | 0 | 0.56 | 2.51 | 2.15 | 10.56 |
| 3 | A | Si Glycol Copolymer | 5 | 0.08 | 2.09 | 0.24 | 8.37 |
| 4 | B | Si Glycol Copolymer | 5 | 2.59 | 4.13 | 19.75 | 22.39 |
| 5 | B | Oleyl | 5 | 0.23 | 3.17 | 0.87 | 5.47 |
| 6 | B | Oleyl | 10 | 0.16 | 3.17 | 0.32 | 5.47 |
| 7 | B | Oleyl | 10 | 0.16 | 1.58 | 0.79 | 4.78 |
| 8 | B | Oleyl | 15 | 0.08 | 1.58 | 0.28 | 4.78 |
| 9 | B | Oleyl | 20 | 0.34 | 1.58 | 1.63 | 4.78 |
| 10 | B | Oleyl | 10 | 1.32 | 1.68 | 2.44 | 5.13 |
| 11 | B | n-stearyl | 10 | 1.68 | 1.68 | 4.33 | 5.13 |
| 12 | B | i-stearyl | 5 | 0.76 | 1.35 | 2.93 | 5.58 |

As can be seen from Table I hereinabove, curable coating compositions containing the reaction product of the instant invention, with or without an additive, had significant reduction in the amount of mist coming off the coater during high speeds in comparison to curable coatings which do not contain the reaction product of this invention.

EXAMPLES 13–28

A reaction product was prepared according to the procedure described hereinabove in Examples 1–12, however in this instance one of three different silicone glycol copolymers in varying amounts were added to the reaction product prior to addition of the catalyst and this reaction product tested for its effect on the amount of misting coming off of the coater. Into a 500 ml 3-neck flask were added about 100 parts of a trimethylsiloxy-endblocked-polydimethylsiloxane-methylhydrogensiloxane copolymer having a total average degree of polymerization of about 12 and about 50 mole percent methylhydrogen moiety on the siloxane chain, about 0.01 parts of a dimethylvinylsiloxy-endblocked polydimethylsiloxanepolymethylperfluorobutylethylsiloxane-methylvinylsiloxane copolymer having a degree of polymerization of about 300, and about 10 parts of polypropylene glycol having an average molecular weight of about 2000. Next, the mixture was heated to a temperature of from about 120° to 130° C. and this temperature was maintained for about 30 minutes. During this time the mixture in the flask was stirred and purged with nitrogen gas. The reaction temperature was then cooled down to room temperature. Next, about 0.05 parts of 1 percent by weight solution of potassium silanolate in toluene was added to this mixture with stirring and this mixture was then purged with nitrogen gas in the flask. Additional catalyst was then added to the mixture at room temperature to increase the viscosity of the reaction product until a target viscosity was obtained. When the viscosity of the reaction product reached the target viscosity, small pieces of dry ice were added to the flask to neutralize the basic catalyst. The neutralized salt was then removed through a pressure filter and the solvent was stripped using a rotoevaporator. About 2 parts of each of the above prepared reaction products were then separately added to about 100 parts of a Curable Coating comprising 100 parts of an organopolysiloxane having the general formula $HexMe_2SiO(Me_2SiO)_a(MeHexSiO)_bSiMe_2Hex$ wherein said organopolysiloxane has about 2 mole percent hexenyl groups and an average degree of polymerization of about 150. Next, one of the three different types of silicone glycol copolymer delineated below were added to this mixture, the copolymers having the average formulae:

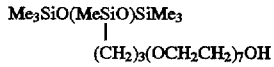 (a)

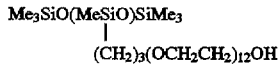 (b)

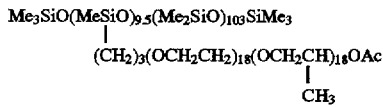 (c)

was added to 100 parts of the above reaction product. The type and amount of each silicone glycol copolymer added is delineated in Table II hereinbelow. The three curable coatings each containing one of the above prepared reaction products of the instant invention was then tested for the amount of silicone mist generated from the coater, as described hereinabove. The results of this test are delineated in Table II hereinbelow. In all the examples except 13 and 14, high shear was applied for about 5 minutes to the Curable Coatings containing the reaction product of the instant invention by using a Turrax (TM) mixer prior to the coating being tested for mist. In examples 13, 14, 21, and 25 the reaction product of the instant invention was entirely omitted from the curable coating (i.e. the curable coating itself was tested). In example 15, only the reaction product of the instant invention was added to the curable coating, no alcohol or silicone glycol copolymer was employed during the formation of the reaction product in this example.

TABLE II

| Example | Si Glycol Copolymer Type | Amount (parts) | Total Mist (mg/m³) 1500 ft/min. | Total Mist (mg/m³) 2000 ft/min. |
|---|---|---|---|---|
| 13 | — | 0 | 2.51 | 10.57 |
| 14 | — | 0 | 2.30 | 9.47 |
| 15 | — | 0 | 0.09 | 0.14 |
| 16 | — | 0 | 0.56 | 2.15 |
| 17 | a | 5 | 0.11 | 0.45 |
| 18 | a | 10 | 0.09 | 0.30 |
| 19 | a | 20 | 0.07 | 0.45 |
| 20 | a | 40 | 0.18 | 0.65 |
| 21 | b | 0 | 2.09 | 8.37 |
| 22 | b | 5 | 0.08 | 0.24 |
| 23 | b | 10 | 0.11 | 0.46 |
| 24 | b | 20 | 0.18 | 0.49 |
| 25 | c | 0 | 2.09 | 8.37 |
| 26 | c | 5 | 0.12 | 0.49 |
| 27 | c | 10 | 0.11 | 0.35 |
| 28 | c | 20 | 0.16 | 0.75 |

As can be seen from Table II hereinabove, curable coating compositions containing the reaction product of the instant invention, with or without an additive, had significantly lower misting values in contrast to curable coatings which do not contain the reaction product of this invention.

EXAMPLES 29–34

The effect of adding a monohydric alcohol to the reaction product of the instant invention was tested in this instance. Into a 500 ml 3-neck flask were added about 100 parts of a trimethylsiloxy-endblocked-polydimethylsiloxane-methylhydrogensiloxane copolymer having a total average degree of polymerization of about 12 and about 50 mole percent methylhydrogen moiety on the siloxane chain, about 0.01 parts of a dimethylvinylsiloxy-endblocked polydimethylsiloxane-polymethylperfluorobutylethylsiloxane-methylvinylsiloxane copolymer having a degree of polymerization of about 300, and about 10 parts of polypropylene glycol having an average molecular weight of about 2000. Next, about 15 parts of oleyl alcohol was added to 100 parts of this mixture. Next, the mixture was heated to a temperature of from about 120° to 130° C. and this temperature was maintained for about 30 minutes. During this time the mixture in the flask was stirred and purged with nitrogen gas. The reaction temperature was then cooled down to room temperature. Next, about 0.05 parts of a 10 percent by weight solution of potassium silanolate in xylene was added to the mixture with stirring and the mixture then purged with nitrogen gas in the flask. Additional catalyst was then added to the mixture at room temperature to increase the viscosity of the reaction product until a target viscosity was obtained. When the viscosity of the reaction product reached the target viscosity, small pieces of dry ice were added to the flask to neutralize the basic catalyst. The neutralized salt was then removed through a pressure filter and the solvent was stripped using rotoevaporator.

An amount of the above prepared reaction product, denoted in Table III, was then added to about 100 parts of a curable coating comprising 97.4 parts of an organopolysiloxane having the general formula $HexMe_2SiO(Me_2SiO)_a(MeHexSiO)_bSiMe_2Hex$ wherein said organopolysiloxane has about 2 mole percent hexenyl groups and an average degree of polymerization of about 150, 1.8 parts of a platinum catalyst (a soluble platinum complex containing 0.67% platinum formed from chloroplatinic acid and divinyltetramethyldisiloxane), 0.8 parts of bis(2-methoxy- 1-methylethyl) maleate, and about 4.1 parts of a trimethylsiloxy-endblocked-polydimethylsiloxane-methylhydrogensiloxane copolymer having a total average degree of polymerization of about 40 and about 70 mole percent methylhydrogen moiety on the siloxane chain. The curable coating containing the reaction product of the instant invention were then tested for the amount of silicone mist generated from the coater, as described hereinabove. The results of this test are delineated in Table III hereinbelow. High shear was applied for about 1 minute to the Curable Coating by using a Turrax (TM) mixer prior to the coating being tested for mist. As a comparison, the amount of mist generated by the curable coating without the reaction product of this invention was also measured.

TABLE III

| Example | Reaction Product (parts per 100 parts of curable coating) | Total Mist (mg/m³) 1500 ft/min. | Total Mist (mg/m³) 2000 ft/min. |
|---|---|---|---|
| 29 | 0 | 1.71 | 5.17 |
| 30 | 0.5 | 0.66 | 2.95 |
| 31 | 1 | 0.33 | 0.80 |
| 32 | 1.5 | 0.10 | 0.33 |
| 33 | 2 | 0.11 | 0.28 |
| 34 | 3 | 0.19 | 0.72 |

As can be seen from Table III hereinabove, curable coating compositions containing the reaction product of the instant invention had significantly lower misting values in contrast to curable coatings which do not contain the reaction product of this invention.

EXAMPLES 35–45

The antimisting effect of various additives having a variety of surface tensions was tested in curable silicone coatings. About 10 parts of various additives delineated in Table IV hereinbelow were added to 100 parts of a curable coating containing an organopolysiloxane having the general formula HexMe$_2$SiO(Me$_2$SiO)$_a$(MeHexSiO)$_b$SiMe$_2$Hex wherein said organopolysiloxane has about 2 mole percent hexenyl groups and an average degree of polymerization of about 150. The resulting coating was then tested for its misting effect as delineated above. The surface tension of the particular additive is also described in Table IV below. In Table IV hereinbelow, PPG 2000 denotes polypropylene glycol having a molecular weight of about and PEG 600 denotes polyethylene glycol having a molecular weight of about 600.

TABLE IV

| Example | Additive | Surface Tension at 20° C. | Total Mist (mg/m³) 2000 ft/min. |
|---|---|---|---|
| 35 | — | — | 7.46 |
| 36 | Heptane | 20.1 | 6.41 |
| 37 | Toluene | 27.93* | 6.42 |
| 38 | Xylene | 28.5 | 5.52 |
| 39 | PPG 2000 | 32.00 | 5.88 |
| 40 | Benzyl Alcohol | 35.5 | 1.51 |
| 41 | PEG 600 | 43.00 | 1.84 |
| 42 | Ethylene Glycol | 48.4 | 0.09 |
| 43 | Glycerol | 62.9 | 1.41 |

TABLE IV-continued

| Example | Additive | Surface Tension at 20° C. | Total Mist (mg/m³) 2000 ft/min. |
|---|---|---|---|
| 44 | 1,2-propane diol | 72* | 1.73 |
| 45 | Water | 72.9 | 1.11 |

*at 25° C.

It can be seen from Table IV hereinabove that an organic liquid having a surface tension of greater than about 32 dynes/centimeter has a significant effect on the amount of silicone mist generated by a curable silicone coating during high speed processing.

EXAMPLES 46–50

In the examples hereinbelow, the aerosol suppressant effect of the compositions of the instant invention were tested. Into a 1000 ml 3-neck flask were added about 400 parts of a trimethylsiloxy-endblocked-methylhydrogensiloxane polymer having a an average degree of polymerization of about 60 and about 47 parts of polyethylene glycol having an average molecular weight of about 600. Next, the mixture was heated to a temperature of about 150° C. and this temperature was maintained for about 30 minutes. During this time the mixture in the flask was stirred and purged with nitrogen gas. Next, about 3.72 parts of dry palladium on carbon (a 5% mixture) was added to this mixture with stirring. This mixture was then heated at a temperature of about 150° C. for about 4 days. During this time the mixture was purged with nitrogen gas in the flask. The reaction temperature was then cooled down to room temperature. The supported catalyst was then filtered.

An amount (delineated in Table V hereinbelow) of the above prepared reaction product was then added to about 100 parts of a silicone curable coating which is delineated hereinbelow. The curable coating comprised 97.4 parts of an organopolysiloxane having the general formula HexMe$_2$SiO (Me$_2$SiO)$_a$(MeHexSiO)$_b$SiMe$_2$Hex wherein said organopolysiloxane has about 2 mole percent hexenyl groups and an average total viscosity of about 450 mm²/s, 1.8 parts of a platinum catalyst (a soluble platinum complex containing 0.67% platinum formed from chloroplatinic acid and divinyltetramethyldisiloxane), 0.8 parts of bis(2-methoxy-1-methylethyl)maleate, and about 4 parts of a trimethylsiloxy-endblocked-polydimethylsiloxane-methylhydrogensiloxane copolymer having a total average degree of polymerization of about 40 and about 70 mole percent methylhydrogen moiety on the siloxane chain. The curable coating containing the reaction product of the instant invention were then tested for the amount of silicone mist generated from a 12" forward roll coater according to the procedure described hereinabove. The mean values of total mist are delineated in Table V hereinbelow.

TABLE V

| Example | Reaction Product (parts per 100 parts of curable coating) | Total Mist (mg/m³) 1500 ft/min. |
|---|---|---|
| 46 | 0 | 3.54 |
| 47 | 1 | 0.56 |
| 48 | 2 | 0.42 |

TABLE V-continued

| Example | Reaction Product (parts per 100 parts of curable coating) | Total Mist (mg/m³) 1500 ft/min. |
| --- | --- | --- |
| 49 | 3 | 0.26 |
| 50 | 4 | 0.26 |

As can be seen from Table V hereinabove, curable coating compositions containing the reaction product of the instant invention had significantly lower misting values in contrast to curable coatings which do not contain the reaction product of this invention.

EXAMPLES 51–53

In the examples hereinbelow, the aerosol suppressant effect of the compositions of the instant invention were tested in radiation curable coating compositions. Into a 500 ml 3-neck flask were added about 200 parts of a trimethylsiloxy-endblocked-polydimethylsiloxane-methylhydrogensiloxane copolymer having a total average degree of polymerization of about 12 and about 50 mole percent methylhydrogen moiety on the siloxane chain, about 0.03 parts of a dimethylvinylsiloxy-endblocked-polydimethylsiloxane-polymethylperfluorobutylethylsiloxane-methylvinylsiloxane copolymer having a degree of polymerization of about 300, about 20 parts of polypropylene glycol having an average molecular weight of about 2000, and about 30 parts of oleyl alcohol. Next, the mixture was heated to a temperature of from about 120° to 130° C. and this temperature was maintained for about 30 minutes. During this time the mixture in the flask was stirred and purged with nitrogen gas. The reaction temperature was then cooled down to about 90° C. Next, about 0.1 parts of a 5 percent by weight solution of potassium silanolate in xylene was added to this mixture with stirring and this mixture was then purged with nitrogen gas in the flask. Additional catalyst was then added to the mixture at room temperature to increase the viscosity of the reaction product until a target viscosity was obtained. When the viscosity of the reaction product reached a target viscosity, small pieces of dry ice were added to the flask to neutralize the basic catalyst. The neutralized salt was then removed through a pressure filter.

An amount of the above prepared reaction product was then added to about 100 parts of a radiation curable coating delineated hereinbelow. The radiation curable coating comprised 100 parts of a silicone vinyl ether copolymer containing approximately 17% by weight vinyl ether and having the general formula

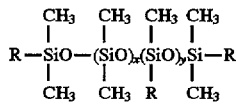

wherein R denotes the group —$(CH_2)_2Si[O(CH_2)_4OCH=CH_2]_3$ and having a viscosity of about 1200 mPa.s (millipascal-seconds) and 1 part of a tolyl(didodecylphenyl) iodonium trifluoromethanesulfonate (i.e. triflate) initiator. The curable coatings containing the reaction product of the instant invention were then tested for the amount of silicone mist generated off of a coater as described hereinabove. The results of this test are delineated in Table VI hereinbelow.

TABLE VI

| Example | Reaction Product (parts per 100 parts of curable coating) | Total Mist (mg/m³) 1500 ft/min. | Total Mist (mg/m³) 2000 ft/min. |
| --- | --- | --- | --- |
| 51 | 0 | 11.03 | 10.08 |
| 52 | 5 | 4.91 | 7.00 |
| 53 | 10 | 5.66 | 4.95 |

As can be seen from Table I hereinabove, the radiation curable coating compositions containing the reaction product of the instant invention had significant reduction in the amount of mist coming off the coater during high speeds in comparison to a radiation curable coating which does not contain the reaction product of this invention.

EXAMPLES 54–75

Into a 500 ml 3-neck flask were added about 100 parts of a trimethylsiloxy-endblocked-polydimethylsiloxane-methylhydrogensiloxane copolymer having a total average degree of polymerization of about 12 and about 50 mole percent methylhydrogen moiety on the siloxane chain, about 0.01 parts of a dimethylvinylsiloxy-endblocked polydimethylsiloxane-polymethylperfluorobutylethylsiloxane-methylvinylsiloxane copolymer having a degree of polymerization of about 300, and an amount of a glycol denoted in Table VII hereinbelow. Next, the mixture was heated to a temperature of from about 120° to 130° C. and this temperature was maintained for about 30 minutes. During this time the mixture in the flask was stirred and purged with nitrogen gas. The reaction temperature was then cooled down to room temperature. Next, about 0.05 parts of potassium silanolate (denoted "no solv" in Table VII hereinbelow) or 200 parts of toluene in 100 parts of the above mixture and then 0.05 parts of potassium silanolate (denoted "toluene" in Table VII hereinbelow), was added to this mixture with stirring and this mixture was then purged with nitrogen gas in the flask. The type of catalyst employed is denoted in Table VII hereinbelow. Additional catalyst was then added to the mixture at room temperature to increase the viscosity of the reaction product until a target viscosity was obtained. When the viscosity of the reaction product reached the target viscosity, small pieces of dry ice were added to the flask to neutralize the basic catalyst. The neutralized salt was then removed through a pressure filter and the solvent was stripped using a rotoevaporator (when toluene was used as a solvent).

About 1.5 parts of each of the above prepared reaction product was then added to about 100 parts of a Curable Coating comprising 100 parts of an organopolysiloxane having the general formula $HexMe_2SiO(Me_2SiO)_a(MeHexSiO)_bSiMe_2Hex$ wherein said organopolysiloxane has about 2 mole percent hexenyl groups and an average degree of polymerization of about 150. The curable coating containing the above prepared reaction product of the instant invention was then tested for the amount of silicone mist generated off of a coater as described hereinabove. As a comparison, the amount of mist generated by the curable coating above without the reaction product of this invention was also measured and this is denoted in Table I as the Comparison (Comp.) Coating. The results of this test are delineated in Table VII hereinbelow. In Table VII hereinbelow, PEG 600 denotes polyethylene glycol having a molecular weight of about 600, PPG 1000 denotes polypropylene glycol having a molecular weight of 1000, and PPG 2000 denotes polypropylene glycol having a molecular weight of 2000.

TABLE VII

| Catalyst | | Glycol | | Total Mist (mg/m³) | | | |
|---|---|---|---|---|---|---|---|
| | | | | 1500 ft/min. | | 2000 ft/min. | |
| Ex. Type | Type | | Amount (Parts) | Invention | Comp. Coating | Invention | Comp. Coating |
| 54 toluene | PEG 600 | | 10 | 1.83 | 1.28 | 6.23 | 4.91 |
| 55 toluene | PEG 600 | | 6 | 0.74 | — | 2.21 | — |
| 56 toluene | PEG 600 | | 8 | 1.07 | — | 2.34 | — |
| 57 toluene | PEG 600 | | 10 | 0.39 | 1.28 | 0.83 | 4.91 |
| 58 toluene | PEG 600 | | 15 | 0.49 | 1.28 | 2.14 | 4.91 |
| 59 no solv | PPG 1000 | | 5 | 0.39 | 1.87 | 1.50 | 4.91 |
| 60 no solv | PPG 1000 | | 10 | 0.79 | 1.45 | 2.17 | 4.77 |
| 61 no solv | PPG 2000 | | 8 | 0.02 | 0.37 | 0.17 | 2.00 |
| 62 no solv | PPG 2000 | | 10 | 0.58 | 2.55 | 2.77 | 6.43 |
| 63 no solv | PPG 2000 | | 10 | 0.33 | 2.55 | 0.88 | 6.43 |
| 64 no solv | PPG 2000 | | 10 | 0.15 | 1.48 | 0.51 | 4.46 |
| 65 no solv | PPG 2000 | | 10 | 0.13 | 1.87 | 0.20 | 4.91 |
| 66 no solv | PPG 2000 | | 10 | 0.13 | 2.55 | 0.15 | 6.43 |
| 67 no solv | PPG 2000 | | 10 | 0.13 | 1.48 | 0.27 | 4.46 |
| 68 no solv | PPG 2000 | | 10 | 0.19 | 2.55 | 0.27 | 6.43 |
| 69 no solv | PPG 2000 | | 10 | 0.19 | 1.48 | 0.27 | 4.46 |
| 70 no solv | PPG 2000 | | 15 | 0.33 | 1.28 | 0.38 | 4.91 |
| 71 no solv | PPG 2000 | | 20 | 0.25 | 1.45 | 0.62 | 4.77 |
| 72 no solv | PPG 2000 | | 20 | 0.26 | 1.45 | 0.71 | 4.77 |
| 73 no solv | PPG 2000 | | 43 | 0.92 | 3.68 | 4.45 | 7.02 |
| 74 no solv | PPG 2000 | | 59 | 0.24 | 1.48 | 1.27 | 4.46 |
| 75 no solv | PPG 2000 | | 60 | 0.68 | 1.48 | 4.62 | 4.46 |

As can be seen from Table III hereinabove, curable coating compositions containing the reaction product of the instant invention had consistently lower misting values when compared to curable coatings which do not contain the reaction product of this invention.

EXAMPLES 76–79

The cure rate of a silicone coating is measured by determining the time to reach to the state of No smear, No migration and No rub-off (NNN time). A cured coating is subjected to a finger rubbing test for No rub-off and No smear time. At a testing temperature the silicone coating is allowed to cure for a certain period time with a 5 second increment each time. And then the coating surface is rubbed by a pointing finger several times. When the resulting coating surface is free from finger trace the coating reaches No smear. When the cured coating stays on the substrate securely without rubbing off then the No rub-off condition is achieved. On the cured coating a strip of standard pressure sensitive testing tape is pressed down together and then gently released off from the coating surface. And then near both ends of the adhesive strip is allowed to adhere together on the sticky surface and then peel the strips off at a constant speed with hands. If there is silicone migration on the adhesive surface the two ends of the tape will pull off each other. When the coating reaches No migration the two sides of sticky adhesive will stick together and the stuck line will continuously travel down as the peeling processes. In the present example the NNN times at various temperatures were recorded as a measure of anchorage on the substrate. The coating formulations without the additive of this invention did obtain No smear and No migration but did not achieve the No rub-off condition. That was indicated as nca (no cure achieved) in the Table VIII below.

An aerosol suppressant composition was prepared according to the procedure outlined in Examples 46–50 hereinabove.

An amount (shown in Table VIII) of the above prepared aerosol suppressant, was then added to about 10 parts of a curable coating comprising 97 parts of an organopolysiloxane having the general formula $HexMe_2SiO(Me_2SiO)_a$ $(MeHexSiO)_bSiMe_2Hex$ wherein said organopolysiloxane has about 2 mole percent hexenyl groups and an average degree of polymerization of about 150, 1.8 parts of a platinum catalyst (a soluble platinum complex containing 0.67% platinum formed from chloroplatinic acid and divinyltetramethyldisiloxane), 0.95 parts of diethyl fumarate, 0.4 parts of benzyl alcohol, and an amount (denoted shown in Table VIII) of a trimethylsiloxy-endblocked-polydimethylsiloxane-methylhydrogensiloxane copolymer having a total average degree of polymerization of about 40 and about 70 mole percent methylhydrogen moiety on the siloxane chain denoted in Table VIII hereinbelow. As a comparison, a curable coating composition which did not contain the aerosol suppressant composition of this invention was also prepared (denoted Comparison Example).

TABLE VIII

| | Example | | | | |
|---|---|---|---|---|---|
| Composition | Comparison Example | 76 | 77 | 78 | 79 |
| crosslinker (parts) | 0.42 | 0.32 | 0.28 | 0.23 | 0.21 |
| Suppressant (parts) | 0 | 0.07 | 0.1 | 0.14 | 0.15 |

The curable coating compositions prepared above (Comparison Example and Examples 76–79) were then tested for cure time (seconds) to No smear, No migration and No rub-off (NNN time) as described above, on mylar and biaxially oriented polypropylene film (BOPP) at various cure temperatures (sec). The results are shown in Table IX hereinbelow.

TABLE IX

| Composition | cure temperature (°F.) | Substrate | Cure Time (sec. to NNN) |
|---|---|---|---|
| Comparison | 180 | Mylar Film | nca* |
| Example | 190 | Mylar Film | nca* |
|  | 200 | Mylar Film | nca* |
|  | 220 | Mylar Film | nca* |
|  | 300 | Mylar Film | nca* |
| Example 76 | 180 | Mylar Film | 70 |
|  | 190 | Mylar Film | 50 |
|  | 200 | Mylar Film | — |
|  | 220 | Mylar Film | — |
|  | 300 | Mylar Film | — |
| Example 77 | 180 | Mylar Film | 10 |
|  | 190 | Mylar Film | 5 |
|  | 200 | Mylar Film | <5 |
|  | 220 | Mylar Film | <5 |
|  | 300 | Mylar Film | <5 |
| Example 78 | 180 | Mylar Film | 5 |
|  | 190 | Mylar Film | <5 |
|  | 200 | Mylar Film | <5 |
|  | 220 | Mylar Film | <5 |
|  | 300 | Mylar Film | <5 |
| Comparison | 180 | BOPP Film | nca* |
| Example | 190 | BOPP Film | nca* |
|  | 200 | BOPP Film | nca* |
|  | 220 | BOPP Film | nca* |
|  | 300 | BOPP Film | nca* |
| Example 77 | 180 | BOPP Film | — |
|  | 190 | BOPP Film | — |
|  | 200 | BOPP Film | 5 |
|  | 220 | BOPP Film | <5 |
|  | 300 | BOPP Film | <5 |
| Example 79 | 180 | BOPP Film | — |
|  | 190 | BOPP Film | 5 |
|  | 200 | BOPP Film | 5 |
|  | 220 | BOPP Film | <5 |
|  | 300 | BOPP Film | 5 |

*nca = indicates no cure achieved (i.e. there was ruboff).

That which is claimed is:

1. A method of making an aerosol suppressant composition, the method comprising the step of: (I) reacting a mixture of:

(A) an organosilicon compound selected from the group consisting of (i) an organosilicon compound having in the compound at least one group selected from the group consisting of olefinic hydrocarbon radicals having from 2 to 14 carbon atoms, vinyl ether groups, epoxy groups, amine groups, hydroxyl groups, alkoxy groups, carboxyl groups, isocyanate groups, oxime groups, acetoxy groups, and mixtures thereof and (ii) a mixture of (i) and an organohydrogensilicon compound;

(B) a compound having its formula selected from the group consisting of:

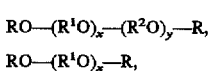

and

RO—(R²O)$_y$—R, wherein R is selected from the group consisting of hydrogen and an olefinic hydrocarbon radical having from 3 to 14 carbon atoms, R¹ and R² are alkylene radicals having from 2 to 4 carbon atoms with the proviso that R¹ and R² are not the same alkylene radical at any given time, x has a value of from 1 to 200, y has a value of from 1 to 200, with the proviso that R is the same on both molecular chain ends;

(C) a catalyst selected from metal catalysts or complexes of metal catalysts; and (D) an aliphatic, alicyclic, aromatic, or polycyclic monohydric alcohol having from 2 to 30 carbon atoms and containing olefinic unsaturation to form a reaction product.

2. A method according to claim 1, wherein the method further comprises adding, after step (I), a silicone glycol copolymer having its general formula selected from the group consisting of

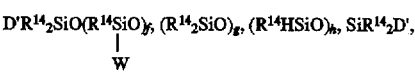

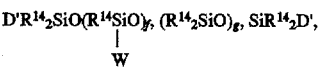

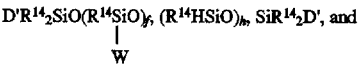

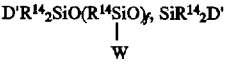

wherein $R^{14}$ is a monovalent hydrocarbon radical having from 1 to 10 carbon atoms, D' is $R^{14}$ or W, f' has a value of 1 to 20, g' has a value of 1 to 200, h' has a value of 1 to 200, W is a polyoxyalkylene group having its average structure selected from

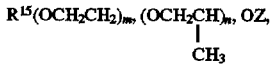

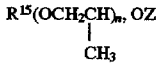

wherein $R^{15}$ is selected from a divalent hydrocarbon group having 1 to 20 carbon atoms or a urethane group, m' has a value of 1 to 50, n' has a value of 1 to 50, and Z is selected from the group consisting of hydrogen, an alkyl radical having 1 to 6 carbon atoms and an acyl group having 2 to 6 carbon atoms with the proviso that the value of m'+m' is greater than 5.

3. A method according to claim 1, wherein the method further comprises heating the mixture of (I).

4. A method according to claim 1, wherein the organohydrogensilicon compound is a compound having the formula

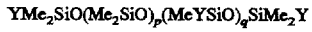

wherein Me denotes methyl, Y is selected from hydrogen or methyl, p has a value of zero or greater than zero, q has a value of zero or greater than zero, p+q has a value of 0 to 1000, with the proviso that there are at least two silicon-bonded hydrogen atoms per compound.

5. A method according to claim 1, wherein (A) is selected from ViMe$_2$SiO(Me$_2$SiO)$_a$SiMe$_2$Vi, HexMe$_2$SiO(Me$_2$SiO)$_a$SiMe$_2$Hex, Vi$_2$MeSiO(Me$_2$SiO)$_a$SiMeVi$_2$, Hex$_2$MeSiO(Me$_2$SiO)$_a$SiMeHex$_2$, Vi$_3$SiO(Me$_2$SiO)$_a$SiVi$_3$, Hex$_3$SiO(Me$_2$SiO)$_a$SiHex$_3$, PhMeViSiO(Me$_2$SiO)$_a$SiPhMeVi, HexMe$_2$SiO(Me$_2$SiO)$_a$(MeHexSiO)$_b$SiMe$_2$Hex, ViMe$_2$SiO(Me$_2$SiO)$_a$(MeViSiO)$_b$SiMe$_2$Vi, Hex$_2$MeSiO(Me$_2$SiO)$_a$(MeHexSiO)$_b$SiMeHex$_2$, Vi$_2$MeSiO(Me$_2$SiO)$_a$(MeViSiO)$_b$SiMeVi$_2$, Hex$_3$SiO(Me$_2$SiO)$_a$(MeHexSiO)$_b$SiHex$_3$, or Vi$_3$SiO(Me$_2$SiO)$_a$(MeViSiO)$_b$SiVi$_3$, wherein Me, Vi, Hex, and Ph denote methyl, vinyl, 5-hexenyl, and phenyl, respectively, a has a value of 0 to 500 and b has value of 0 to 200.

6. A method according to claim 1, wherein (A) is a vinyl ether functional organopolysiloxane having the general formula

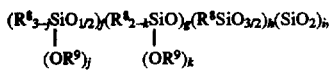

wherein $R^8$ is a monovalent hydrocarbon radical or halohydrocarbon radical having from 1 to 20 carbon atoms, $R^9$ is selected from the group consisting of monovalent hydrocarbon or halohydrocarbon radicals having from 1 to 8 carbon atoms and a group having its formula selected from (i) $-R^{10}OCH=CH_2$ or (ii) $-R^{10}Si[OR^{10}OCH=CH_2]_{3-m}R^8_m$ wherein $R^{10}$ is a divalent hydrocarbon or halohydrocarbon radical having from 1 to 20 carbon atoms, m has a value of 0 to 2, $R^8$ is as defined above, f has a mole percent of from greater than 0 to 100, g has a mole percent of from 0 to less than 100, h has a mole percent of from 0 to less than 100, i' has a mole percent of from 0 to less than 100, j is an integer of from 0 to 3, k is an integer of from 0 to 2, the sum of f+g+h+i' being equal to 100 mole percent, with the proviso that at least one $\equiv SiOR^{10}OCH=CH_2$ group or $\equiv SiOR^{10}Si[OR^{10}CH=CH_2]_{3-m}R^8_m$ group exists per compound.

7. A method according to claim 1, wherein (A) is an organopolysiloxane having the general formula

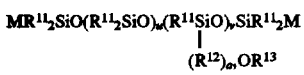

wherein $R^{11}$ is a monovalent hydrocarbon radical having from 1 to 20 carbon atoms, $R^{12}$ is a divalent hydrocarbon group having from 1 to 20 carbon atoms, $R^{13}$ denotes hydrogen or $R^{11}$, a' has a value of 0 or 1, M denotes $R^{11}$ or $-(R^{12})_a OR^{13}$, u is 0 to 500 and v is 0 to 200, with the proviso that there are at least two $-OR^{13}$ groups per compound.

8. A method according to claim 1, wherein (B) is a compound having its formula selected from

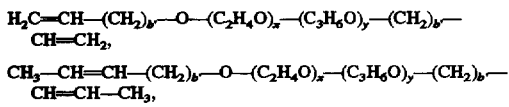

or

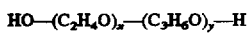

wherein b' has a value of 1 or greater than 1, x has a value of 0 to 200, and y has a value of 0 to 200 with the proviso that the value of x+y is at least 1.

9. A method according to claim 1, wherein (C) is selected from palladium metal, platinum metal, platinum deposited on a carrier, chloroplatinic acid, a complex of chloroplatinic acid and divinyltetramethyldisiloxane, $RhCl_3$, $RhBr_3$, $RhI_3$, $ClRh(PPh_3)_3$, or complexes of alkynes and $H_2PtCl_6$.

10. A method according to claim 1, wherein (C) is selected from potassium hydroxide, potassium silanolate, potassium alcoholate, potassium phenolate, potassium siloxanolate, potassium mercaptide, potassium polyethers, lithium alcoholate, lithium silanolate, lithium siloxanolate, lithium phenolate, lithium mercaptide, anhydrous lithium hydroxide, lithium polyethers, sodium hydroxide, sodium alcoholate, sodium phenolate, sodium silanolate, sodium siloxanolate, or sodium mercaptide.

11. A method according to claim 1, wherein the mixture of (I) further comprises a fluorosilicone polymer having the general formula:

wherein Q denotes an alkenyl radical, Me denotes a methyl radical, TX denotes a silicon-bonded fluorinated radical wherein T denotes a perfluoroalkyl radical having from 4 to 16 carbon atoms, X denotes an alkylene radical linking T to Si through at least 2 carbon atoms, wherein the values of c', d', and e' are such that the fluorosilicone polymer contains at least 5 mol percent $(TX)MeSiO_{2/2}$ siloxane units, and from 0.1 to 10 mol percent alkenyl radical-containing siloxane units.

12. A method according to claim 2, wherein the mixture of (I) further comprises a fluorosilicone polymer having the general formula:

wherein Q denotes an alkenyl radical, Me denotes a methyl radical, TX denotes a silicon-bonded fluorinated radical wherein T denotes a perfluoroalkyl radical having from 4 to 16 carbon atoms, X denotes an alkylene radical linking T to Si through at least 2 carbon atoms, wherein the values of c', d', and e' are such that the fluorosilicone polymer contains at least 5 mol percent $(TX)MeSiO_{2/2}$ siloxane units, and from 0.1 to 10 mol percent alkenyl radical-containing siloxane units.

13. A method according to claim 1, wherein (D) is selected from undecylenyl alcohol, furfuryl alcohol, allyl alcohol, crotyl alcohol, methylvinylcarbinol, cinnamyl alcohol, 5-decen-1-ol, 9-decen-1-ol, 2-methyl-3-buten-1-ol, 2-methyl-3-buten-2-ol, 3-methyl-2-buten-1-ol, 3-methyl-3-buten-1-ol, 2-propenylphenol, 1-octen-3-ol, 7-dodecen-1-ol, 7-tetradecen-1-ol, 9-tetradecen-1-ol, 11-tetradecen-1-ol, 11-hexadecen-1-ol, or oleyl alcohol.

14. A method according to claim 1, wherein the mixture of (I) further comprises an organic compound having at least one group selected from the group consisting of olefinic hydrocarbon radicals having from 2 to 14 carbon atoms, vinyl ether groups, epoxy groups, amine groups, isocyanate groups, oxime groups, acetoxy groups, and mixtures thereof.

15. A method according to claim 14, wherein the organic compound is selected from 1,3-hexadiene, 1,5-hexadiene, 1,4-hexadiene, 2,4-hexadiene, propadiene, 1,3-butadiene, 1,3-pentadiene, 1,4-pentadiene, 1,6-heptadiene, 1,7-octadiene, 1,9-decadiene, hydroxybutylvinylether, hydroxypropylvinylether, p-phenolvinylether, hydroxybutyl-2-methylvinylether, $H(O(CH_2)_2)_3-OCH=CH_2$, 1,2-epoxy-5-hexene, 3,4-epoxy-1-butene, 5,6-epoxy-1-hexene, 7,8-epoxy-1-octene, 11,12-epoxy-1-dodecene, allyl glycidyl ether, 1-methyl-4-isopropenyl cyclohexeneoxide, 1,4-dimethyl-4-vinylcyclohexeneoxide, or 2,6-dimethyl-2,3-epoxy-7-octene.

16. A method according to claim 10, wherein the method further comprises neutralizing the reaction product of step (I).

17. A method according to claim 9, wherein the method further comprises filtering the reaction product of step (I).

18. A composition produced in accordance with the method of claim 1.

19. A composition produced in accordance with the method of claim 2.

20. A composition produced in accordance with the method of claim 13.

* * * * *